(12) United States Patent
Klein et al.

(10) Patent No.: US 9,235,226 B2
(45) Date of Patent: Jan. 12, 2016

(54) METHOD FOR DETERMINING A MAXIMUM POWER POINT OF PHOTOVOLTAIC GENERATORS

(75) Inventors: Jens Klein, Goettingen (DE); Gerd Bettenwort, Kassel (DE); Markus Hopf, Espenau (DE)

(73) Assignee: SMA Solar Technology AG, Niestetal (DE)

( * ) Notice: Subject to any disclaimer, the term of this patent is extended or adjusted under 35 U.S.C. 154(b) by 689 days.

(21) Appl. No.: 13/591,300

(22) Filed: Aug. 22, 2012

(65) Prior Publication Data

US 2013/0027020 A1     Jan. 31, 2013

Related U.S. Application Data

(63) Continuation of application No. PCT/EP2011/052646, filed on Feb. 24, 2011.

(30) Foreign Application Priority Data

Feb. 24, 2010  (EP) .................................... 10154537

(51) Int. Cl.
   *G01R 19/00* (2006.01)
   *G05F 1/67* (2006.01)

(52) U.S. Cl.
   CPC .. *G05F 1/67* (2013.01); *Y02E 10/58* (2013.01)

(58) Field of Classification Search
   None
   See application file for complete search history.

(56) References Cited

U.S. PATENT DOCUMENTS

| | | | | |
|---|---|---|---|---|
| 5,682,305 | A | * 10/1997 | Kurokami et al. | 363/79 |
| 6,057,665 | A | 5/2000 | Herniter et al. | |
| 6,984,970 | B2 * | 1/2006 | Capel | 323/299 |
| 2002/0063552 | A1 * | 5/2002 | Arakawa | 323/237 |

FOREIGN PATENT DOCUMENTS

ES        2326200 A1    2/2009

OTHER PUBLICATIONS

Kazmi Syed Muhammad Raza, et al., "An Improved and Very Efficient MPPT Controller for PV Systems Subjected to Rapidly Varying Atmospheric Conditions and Partial Shading", Power Engineering Conference 2009, AUPEC 2009, Australasian Universities, IEEE, Sep. 27, 2009, p. 1-6.

Patel, H., et al., "Maximum Power Point Tracking Scheme for PV Systems Operating Under Partially Shaded Conditions", IEEE Transactions on Industrial Electronics, IEEE Service Center, Piscataway NJ, vol. 55, No. 4, Apr. 1, 2008, p. 1689-1698.

(Continued)

*Primary Examiner* — Minh N Tang
(74) *Attorney, Agent, or Firm* — Eschweiler & Associates, LLC

(57) ABSTRACT

A method for determining a maximum power point (MPP) of a photovoltaic generator (PV) by variation of at least one parameter of search voltage and search current, within a maximally searchable search area on a power/voltage curve is disclosed. The method includes initializing by defining a start point with a start voltage and a start current, searching for the maximum power point (MPP) in at least one search direction by repeated variation of the search voltage or search current in the search area taking account of at least two limiting conditions for limiting the search area, wherein at least one of the limiting conditions for limiting the search area are is determined with evaluation of parameters provided in an operating state already attained during the search, and ending the search if one of the at least two limiting conditions for limiting the search area is met.

16 Claims, 28 Drawing Sheets

(56) References Cited

OTHER PUBLICATIONS

Bekker, B., et al., "Finding an Optimal PV Panel Maximum Power Point Tracking Method", AFRICON, 2004, 7th Africon Conference in Africa Gaborone, Botswana, vol. 2, Sep. 15-17, 2004, p. 1125-1130.

Ahmed, et al., "A Novel Maximum Power Point Tracking for Photovoltaic Applications Under Partially Shaded Insolation Conditions", Electric Power Systems Research, vol. 78, No. 5, Mar. 1, 2008, p. 777-784.

Esram, T., et al., "Comparison of Photovoltaic Array Maximum Power Point Tracking Techniques", IEEE Transactions on Energy Conversion, IEEE Service Center, vol. 22, No. 2, Jun. 1, 2007, p. 439-449.

PCT Search Report for PCT/EP2011/052646 dated Sep. 8, 2011, p. 1-13.

* cited by examiner

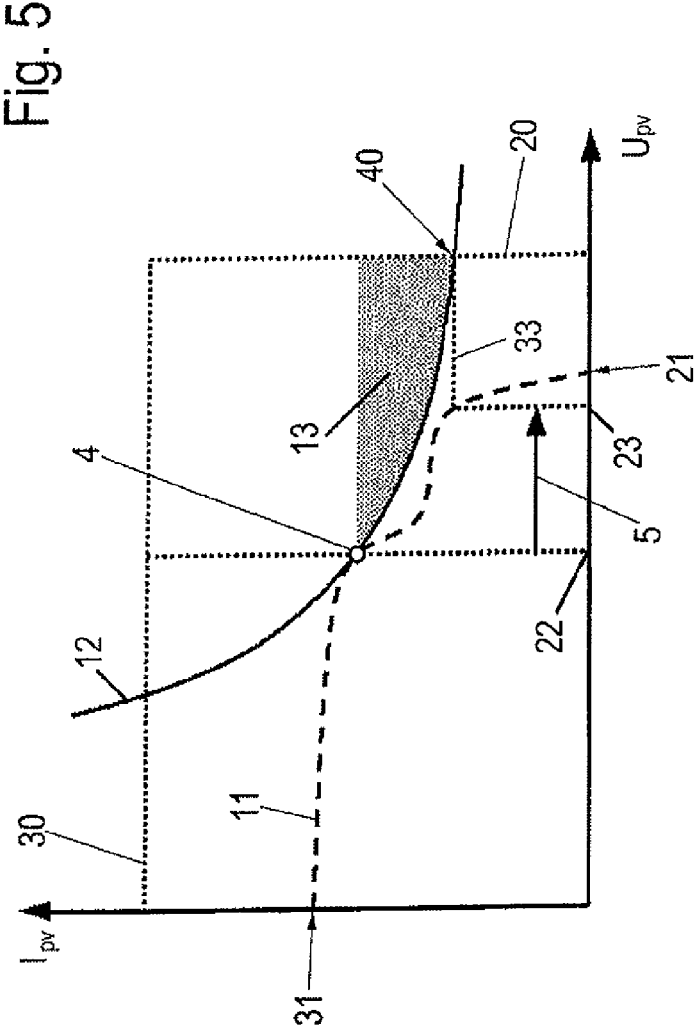

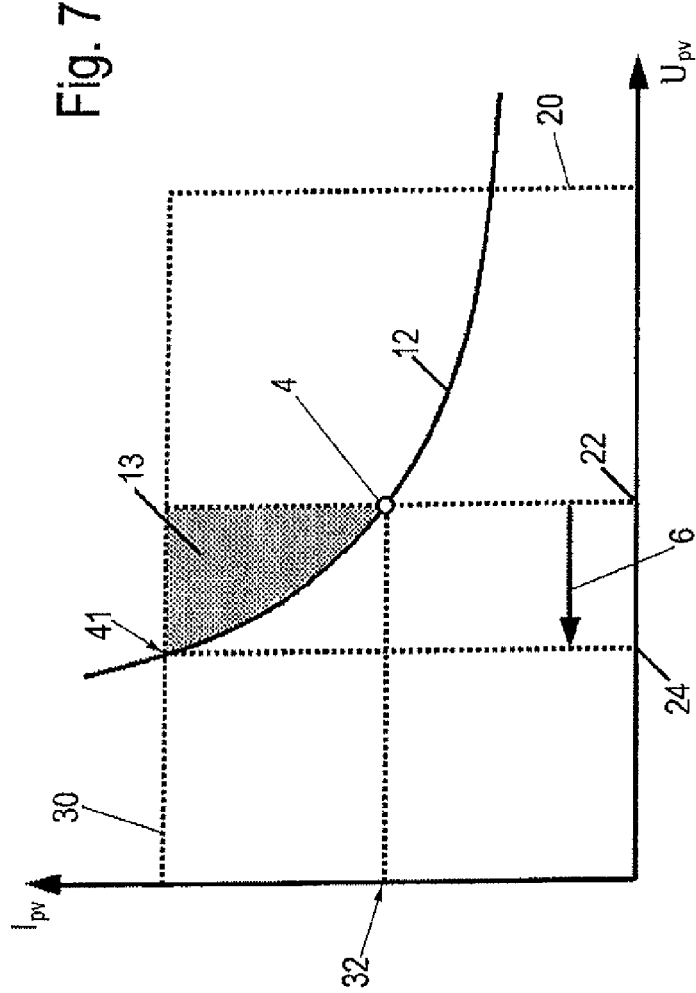

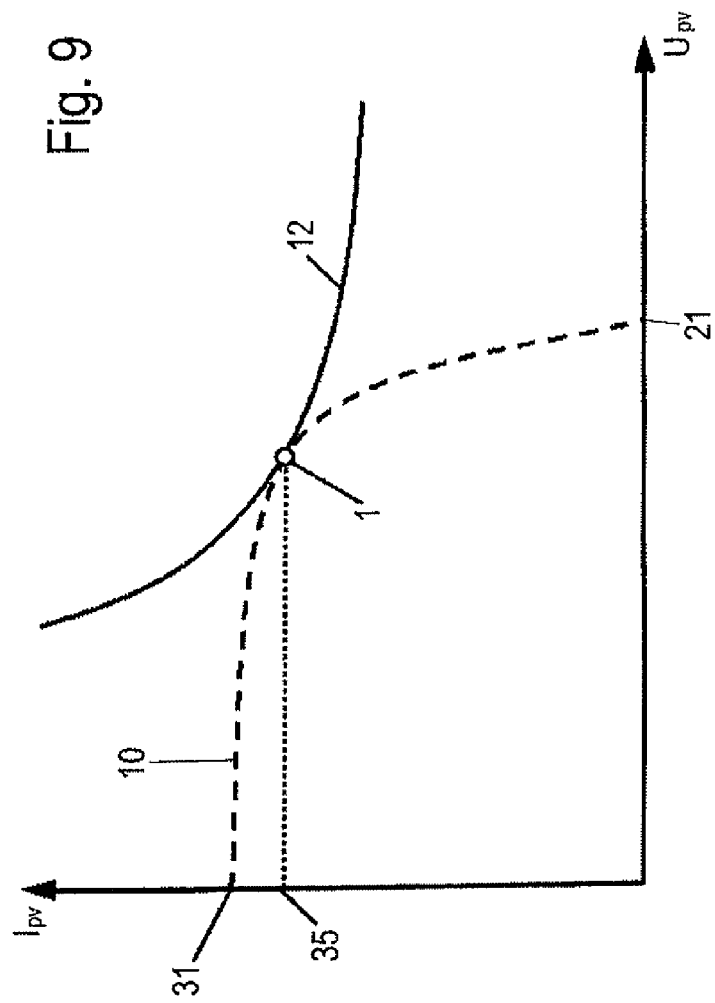

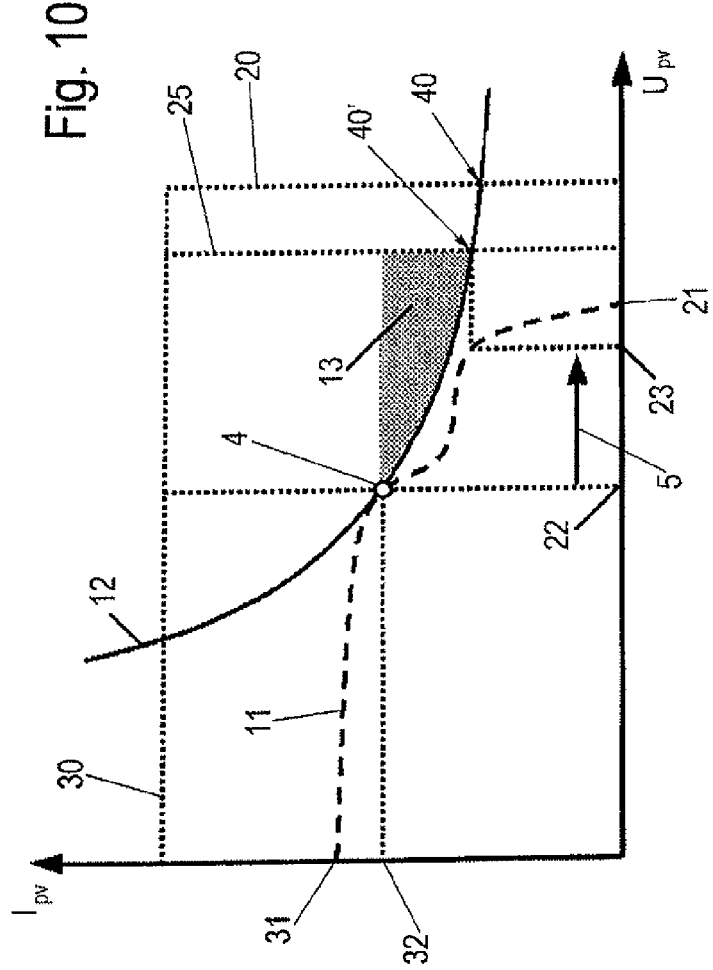

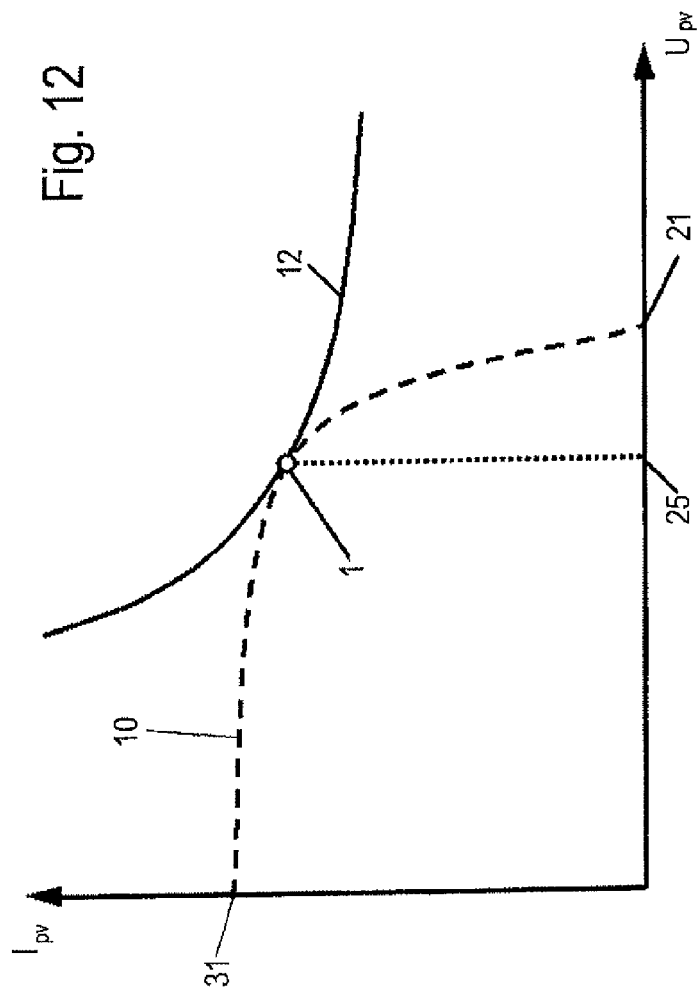

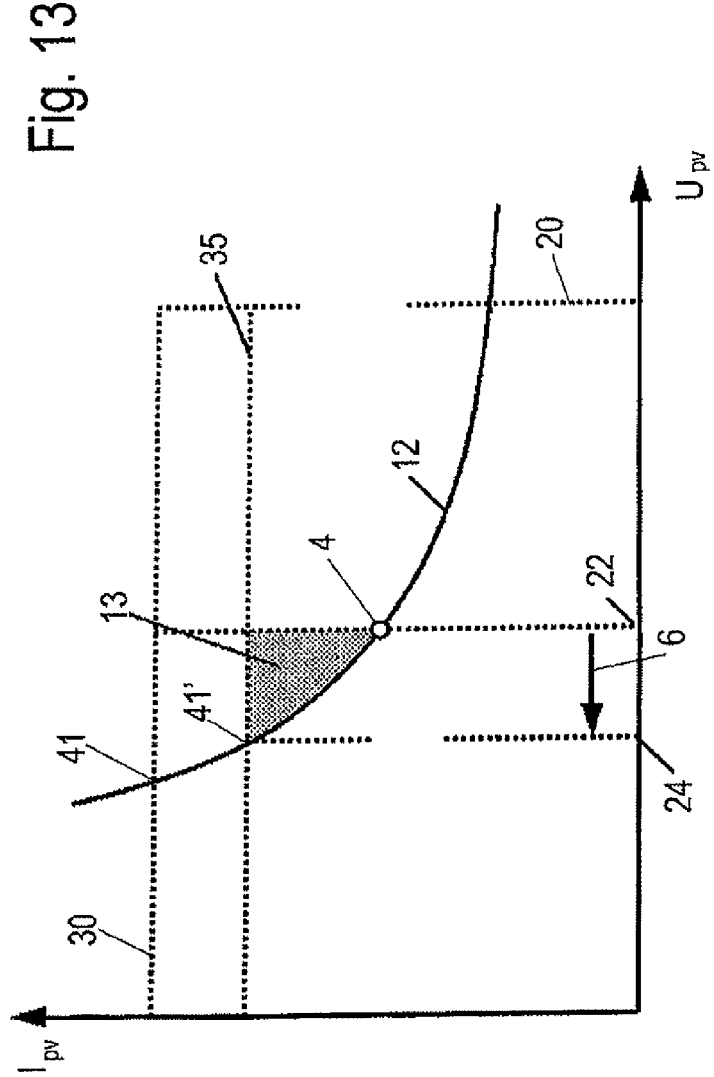

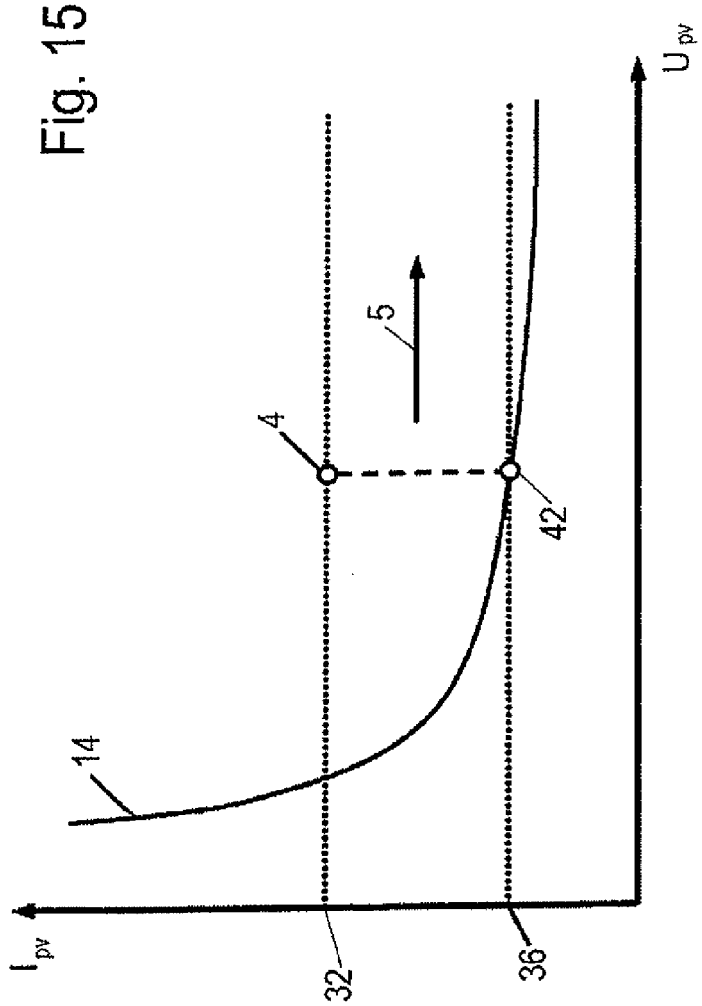

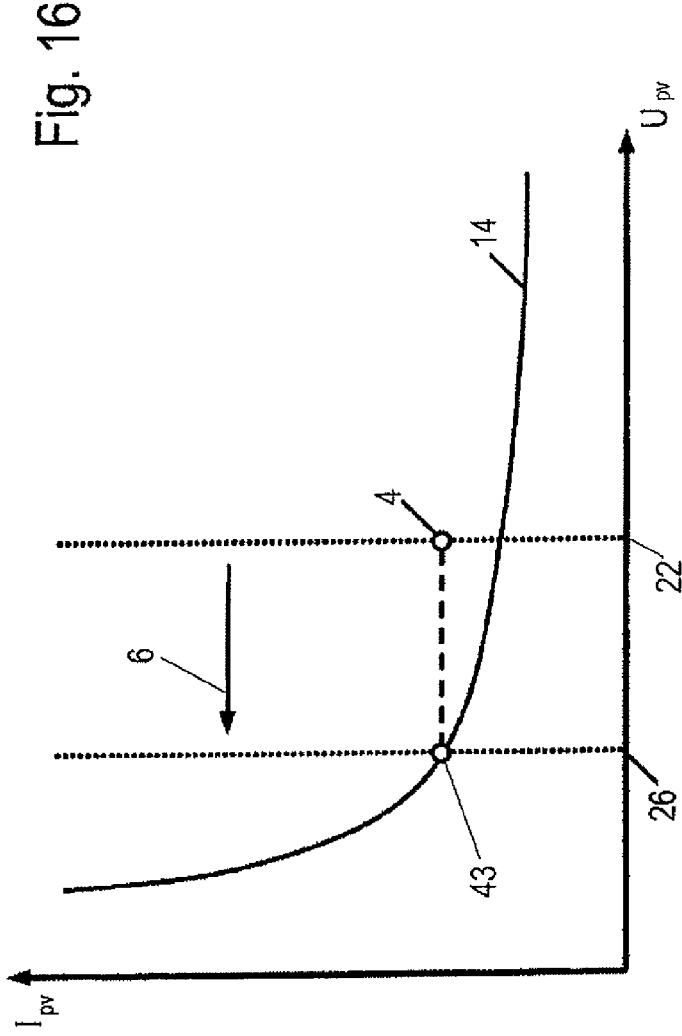

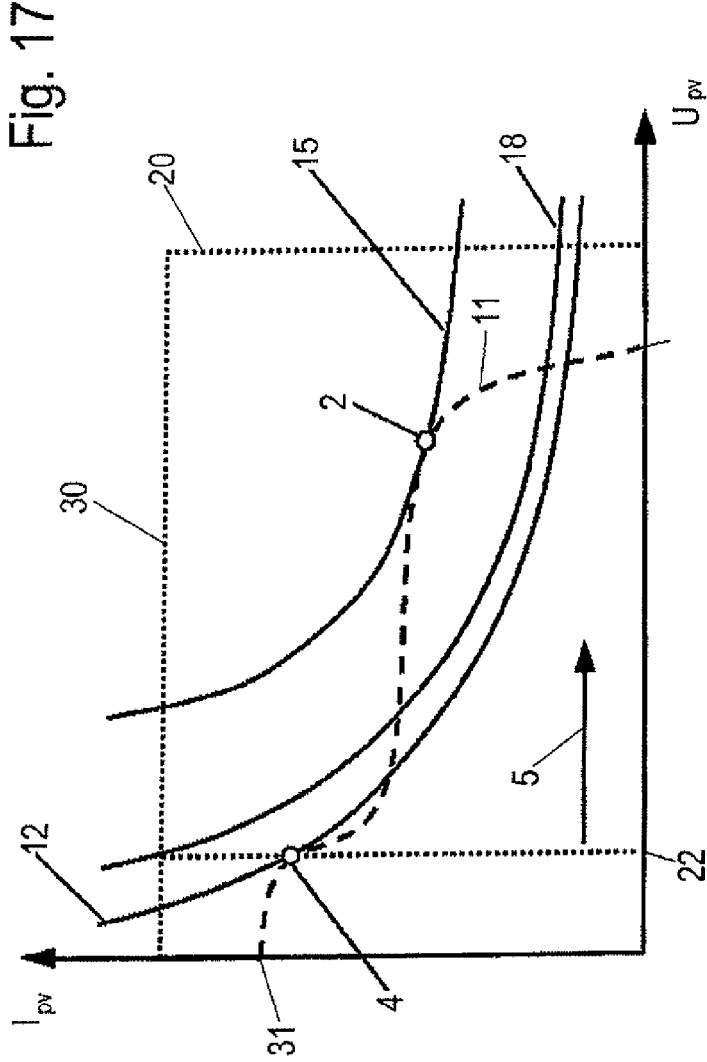

METHOD FOR DETERMINING A MAXIMUM POWER POINT OF PHOTOVOLTAIC GENERATORS

REFERENCE TO RELATED APPLICATIONS

The present application is a continuation application of PCT/EP2011/052646, filed on Feb. 23, 2011, which claims priority to EP 10154537.4, filed on Feb. 24, 2010, the contents both of which are hereby incorporated by reference in their entirety.

FIELD

The invention relates to a method and device for determining a maximum power point (MPP) of a photovoltaic generator (PV) in operation with an inverter.

BACKGROUND

Photovoltaic generators (PV=photovoltaics) generate electrical energy in response to light incidence. In order that the DC voltage generated by the photovoltaic generators can be fed into a public supply network, inverters are required. In the operational control of this inverter, a so-called "maximum power point (MPP) tracker" is used to continuously readjust the power drawn, such that a photovoltaic generator is operated, as much as possible, continuously at the point where maximum power is drawn "MPP" (maximum power point). For this purpose, the MPP tracker varies the current drawn or the voltage by a small magnitude, calculates in each case the product of current and voltage, and adjusts the current or voltage value in the direction of higher power. The sought optimum MPP point of the I-U characteristic curve forms the global maximum of the P-U characteristic curve.

In the case of partial shading of a photovoltaic generator, often more than one local maximum arises in the P-U characteristic curve. In this case, however, it is not possible for most MPP tracking methods to distinguish between local and global maxima. In practice, depending on the originating history of the shadow formation, this can lead to losses of yield if the MPP tracker proceeds to the local MPP and stays there.

In a search over the entire operating area of an installation, energetic losses can arise. Losses can be reduced by restricting searched areas.

ES 2 326 200 discloses a method for determining a maximum power point which permits to distinguish between local maxima and a global or absolute maximum. A search is performed taking account of one limiting condition for limiting the search area. A search under consideration of this condition is ended as soon as the determined power is bigger than the previous maximum power. The search is performed in a single direction in discrete steps having a width calculated from the previous maximum and the determined current.

SUMMARY

In one aspect of the invention, therefore, an optimized method for determining a maximum power point of photovoltaic generators is provided.

By means of the method, during a search for a higher power point, i.e. for the global maximum power point (MPP), the losses occurring during the search are minimized by intelligent limiting of the search area. The prerequisite in this case is that the global maximum power point (MPP) is still situated in the limited search area. Therefore, the search for a higher power point by using defined criteria is intended to be ended when, in the event of the search direction being maintained, there is no longer any prospect of a power increase. In other words, the search direction is maintained as long as there is a prospect of a power increase in the remaining search area. Compared to search methods that end if a power point larger in power than the one previously operated at is found, this keeps the option of finding a power point even higher in power. However, taking the prospect of a further power increase into account, a search is not continued in unpromising cases. Depending on the operating state of the photovoltaic generator and on the technical data of the PV inverter, the search duration and the losses arising during the search can in part be considerably reduced in this way. By way of example, a search is effected by ramping the PV voltage up and down.

A method for determining a maximum power point (MPP) of a photovoltaic generator (PV) by variation of at least one parameter of the two parameters search voltage and search current by means of a device connected downstream of the photovoltaic generator, within a maximally searchable search area on a power/voltage curve is disclosed. The method comprises:

a) initializing by defining a start point with a start power having a start voltage and a start current,
b) searching for the maximum power point (MPP) in at least one search direction by repeated variation of the search voltage or the search current in the search area taking account of at least two limiting conditions for limiting the search area, wherein at least one of the limiting conditions for limiting the search area are is determined with evaluation of parameters provided in an operating state already attained during the search; and
c) ending the search if one of the at least two limiting conditions for limiting the search area in step b) is met.

According to another embodiment, a method for determining a maximum power point (MPP) of a photovoltai generators (PV) by variation of at least one parameter of the two parameters search voltage and search current by means of a device connected downstream of the photovoltaic generator, within a maximally searchable search area on a power/voltage curve is disclosed. The method comprises:

a) initializing by defining a start point with a start power having a start voltage and a start current,
b) searching for the maximum power point (MPP) in a first search direction by repeated variation of the search voltage or the search current in the search area taking account of at least one first limiting condition for limiting the search area, wherein the first limiting condition for limiting the search area are is determined with evaluation of parameters provided in an operating state already attained during the search;
c) ending the search in the first search direction if the first limiting condition for limiting the search area in step b) is met;
d) then searching for the maximum power point (MPP) in a second search direction by repeated variation of the search voltage or of the search current in the search area taking account of at least one second limiting condition for limiting the search area, wherein the second limiting condition for limiting the search area are is determined with evaluation of parameters provided in an operating state already attained during the search; and
e) ending the search in the second search direction if the second limiting condition for limiting the search area in step d) is met.

According to one method, one advantage that should be emphasized is the particular efficiency, as a result of taking account of two more limiting conditions for limiting the search area. Due to the evaluation of the parameters provided in the operating state already attained during the search, the method is adapted to the given operating state in a currently relevant fashion.

According to another method, one advantage that should be emphasized is the particular efficiency, as a result of taking account of two search directions and at least one or more limiting conditions for limiting the search area.

According to one embodiment two or more limiting conditions for limiting a search area are taken into account during the search, in order to increase the efficiency further.

In one embodiment, the at least one limiting condition for limiting a search area can comprise a determined termination condition, for example, a logically determined termination condition, that states that, in the event of a search direction being maintained, there can be no prospect of a power increase. This reduces power losses as a result of the MPP method as it assures that the search is terminated as early as possible. Then again, in other words, the search direction is maintained as long as there is a prospect of a power increase in the remaining search area. Power losses are thus likewise reduced since it is assured that a local MPP is not kept unnecessarily.

According to a further embodiment it is advantageous if the at least one or more limiting condition(s) for limiting the search area is or are determined with evaluation of the parameters given in a prevailing operating state on the basis of a determination of one boundary condition or a plurality of boundary conditions which are given on account of physical boundary conditions in this operating state.

According to one embodiment of the invention it is advantageous if the searching in the first search direction is effected as a right-hand search, in which, from a start point, the search voltage can be increased or the search current can be decreased repeatedly in a stepwise manner.

According to a further embodiment it is furthermore advantageous if the searching in the second search direction is effected as a left-hand search, in which, from a start point, the search voltage is decreased or the search current is increased repeatedly in a stepwise manner.

It is particularly advantageous and increases the accuracy of the MPP method in one embodiment if the fact of whether one of the limiting conditions for limiting the search area is met is constantly checked anew during the progression of the method.

In this case, the at least one limiting condition for limiting a search area can comprise a logically determined termination condition that states that a minimum power is undershot in the event of a search direction being maintained.

It is advantageous if the at least one limiting condition is a termination condition that takes account of one or more of the following parameters individually or in combination:
Upv:=present photovoltaic generator voltage,
Ipv:=present photovoltaic generator current,
Ppv:=present photovoltaic generator power,
Pmin:=a minimum power of the photovoltaic generator that is to be complied with,
Pmax:=maximum power previously found during a search, and
Isearch:=maximum search current (or maximum inverter PV current),
Usearch:=maximum search voltage,
Prated:=rated power of the photovoltaic generator,
ki:=factor MPP current/short-circuit current of a corresponding cell type.

After finding a higher power point during a right-hand search, the left-hand search can be obviated if the product of the start voltage and search current is less than a maximum power or equal to a maximum power, or, after finding a higher power point during a left-hand search, the right-hand search can be obviated if the product of the start current and search voltage is less than a maximum power or equal to a maximum power.

In one embodiment a search direction is chosen before the beginning of a search.

In one embodiment the right-hand search is chosen if the maximum possible power in a right-hand search is greater than the maximum possible power in a left-hand search, and vice versa.

However, it is also conceivable for a search direction to be chosen randomly when the maximum possible power in a left-hand search and the maximum possible power in a right-hand search are identical.

In one embodiment, the maximum power point respectively determined and/or the voltage at this point and/or the current at this point are/is stored.

Moreover, it is advantageous if the point with the maximum determined power is set after the search has been ended.

In one embodiment it should be noted that the searching in the second search direction can also be obviated, if appropriate, if a limiting condition for limiting the search area is met.

In one embodiment the first limiting condition is different from the second limiting condition.

In one embodiment of the method, conditions for limiting the search area are already defined before a search. This simplifies the search further.

In a further embodiment, account is taken of the fact that a defined minimum power must not be undershot during the search. This is advantageous, for example, if the power required for operating the PV inverter is only obtained via a PV string, or is not intended or able to be obtained via the grid to be fed.

The method for searching for a higher or maximum power point with a limited search area can be utilized, inter alia, for transferring an existing tracking method to the global maximum power point MPP or for finding a start point for a tracking method, but it can also itself be utilized as the actual tracking method of an inverter.

In a further embodiment, a start voltage, a start current, a maximum search voltage and a maximum search current can be defined when defining the start point. These values can be updated during the search, as a result of which a search time is shortened.

The searching in the first search direction is implemented by raising a search voltage or lowering a search current and the searching in the second search direction is implemented by lowering a search voltage and raising a search current. In this case, the raising and lowering are effected continuously or in definable steps.

The at least one limiting condition for limiting a search area is a termination condition if, in the event of a search direction being maintained, there is no prospect of a power increase, as a result of which the method is shortened by comparison with known methods.

A further increase in efficiency results if a search direction is chosen before the beginning of a search. This can be done, for example, on the basis of the maximum possible power in a left-hand search and the maximum possible power in a right-hand search. Thus, e.g. the right-hand search can be chosen if the maximum possible power in a right-hand search is greater than the maximum possible power in a left-hand search, and vice versa. If there is no significant difference in the maximum possible powers, a search direction can be chosen randomly. If appropriate, after carrying out the search in the chosen search direction, it is possible for a search in the opposite direction to be obviated.

It is furthermore expedient if a plurality of the limiting conditions are combined with one another.

BRIEF DESCRIPTION OF THE DRAWINGS

The invention will now be explained in greater detail on the basis of an embodiment with reference to the accompanying drawings, in which:

FIG. 5 shows an example graphical illustration of carrying out a right-hand search given voltage predefinition;

FIG. 7 shows an example graphical illustration of carrying out a left-hand search given voltage predefinition;

FIG. 9 shows a graphical illustration for elucidating a maximum power point MPP in the case of an unshaded IU characteristic curve;

FIG. 10 shows a further example graphical illustration of carrying out a right-hand search when taking account of the rated power of the connected PV generator with voltage predefinition;

FIG. 12 shows a further graphical illustration for elucidating a maximum power point MPP in the case of an unshaded IU characteristic curve;

FIG. 13 shows a further example graphical illustration of carrying out a left-hand search when taking account of the rated power of the connected PV generator with voltage predefinition;

FIG. 15 shows an exemplary graphical illustration for deriving a search area limitation for ensuring a defined minimum power during a right-hand search;

FIG. 16 shows an example graphical illustration for deriving a search area limitation for ensuring a defined minimum power during a left-hand search;

FIG. 17 shows an example graphical illustration for elucidating obviation of the search in the opposite direction in the case of a right-hand search;

DETAILED DESCRIPTION

Figure 1:
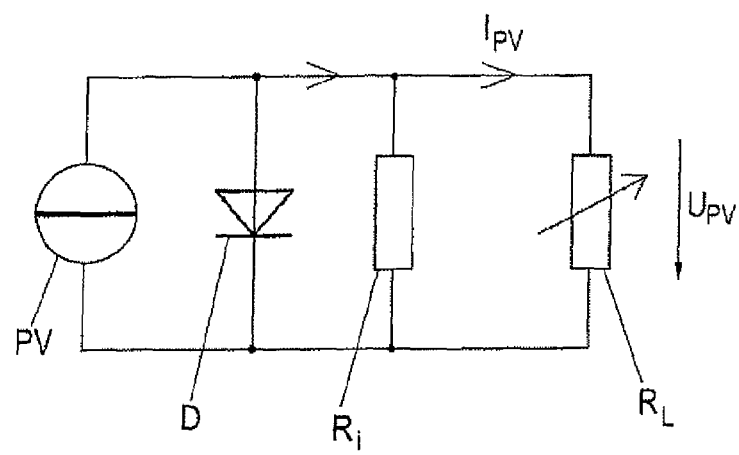
FIG. 1 shows an example equivalent circuit diagram of a photovoltaic generator.

FIG. 1 illustrates an example equivalent circuit diagram of an installation for generating energy.

A photovoltaic generator PV—which comprises, for example, one or more strings of silicon solar cells—is illustrated as a current source PV', which is connected in parallel with a diode D and a resistor Ri. At its terminals, a variable load RL is connected, through which the current Ipv of the PV module flows and across which a voltage Upv is dropped.

A device, for example an arrangement—designated overall as "inverter"—composed of a DC/DC converter and a DC/AC inverter, for example, is generally connected downstream of the photovoltaic generator as a variable load RL, wherein, at the DC/DC converter, the optimum operating point or maximum power point MPP on a power/voltage characteristic curve of the photovoltaic generator PV is set by means of a so-called MPP tracker or an MPP tracking method, which is implemented or proceeds at the DC/DC converter, for example, by means of a microprocessor that controls the DC/DC converter.

This will be described in greater detail below.

Figure 2:
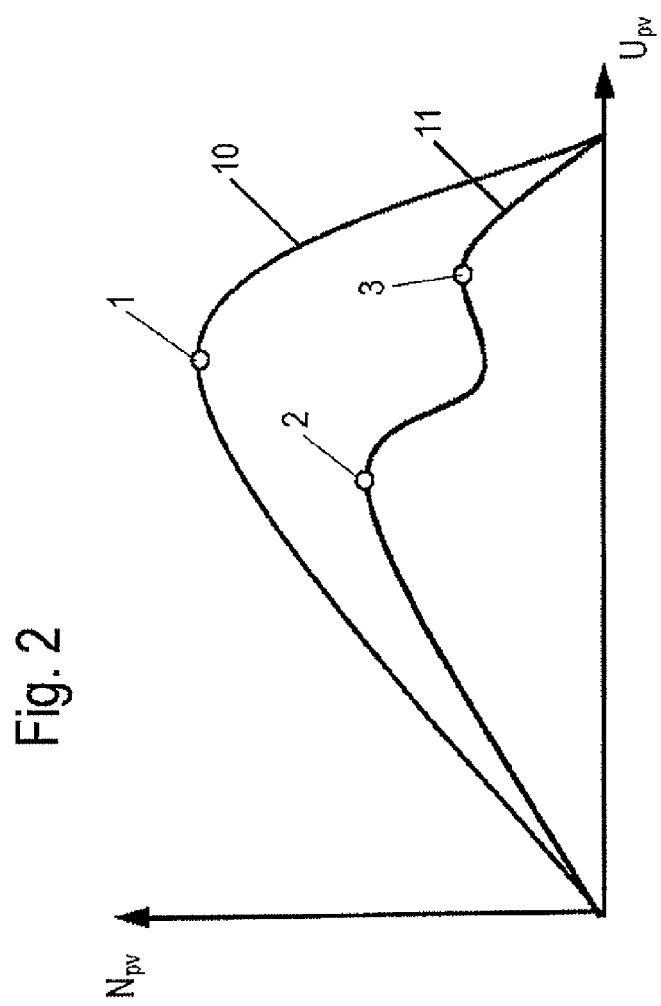
FIG. 2 shows a graphical illustration of example PU characteristic curves of a photovoltaic generator.

FIG. 2 shows a schematic illustration of example power/voltage characteristic curves, or "PU characteristic curves" for short, of a photovoltaic generator PV. A rated characteristic curve 10 of an unshaded photovoltaic generator PV has a maximum. The latter is designated as maximum power point MPP 1.

In the case of a partial shading of the PV module or of the photovoltaic generator, for example, more than one local maximum can arise in the PU characteristic curve, such that e.g. an actual characteristic curve 11 having a global maximum power point MPP 2 and a local maximum power point MPP 3 arises.

In order that a PV module can be operated at the maximum power point MPP in accordance with its respective actual characteristic curve 11, there is the operational control method, which can have a so-called MPP tracking method as a constituent part, or as a subroutine or independent method routine.

The term "right-hand" search should be understood hereinafter to mean a search with the MPP tracking method on the PU characteristic curve in an area on the right from a start point towards higher voltages Upv. In this case, the search voltage is increased or a search current is decreased either repeatedly in a stepwise manner or continuously (in this respect, also see FIG. 5).

The term "left-hand" search should correspondingly be understood to mean a search in an area on the left from a start point towards lower voltages Upv.

In this case, the search voltage is decreased or a search current is increased either repeatedly in a stepwise manner or continuously.

By means of, for example, cyclic or event-triggered interruption of a conventional MPP tracker and by means of a search for a higher maximum power point MPP, the MPP tracker can determine and move to or set the global maximum power point MPP 2.

At this juncture it should be pointed out that the following description of the method according to the invention is described on the basis of a search with voltage predefinition, for the purpose of a simpler illustration. A corresponding implementation of the inventive concept with respect to a search with current predefinition is intended also to be encompassed by the inventive concept.

Figure 3:
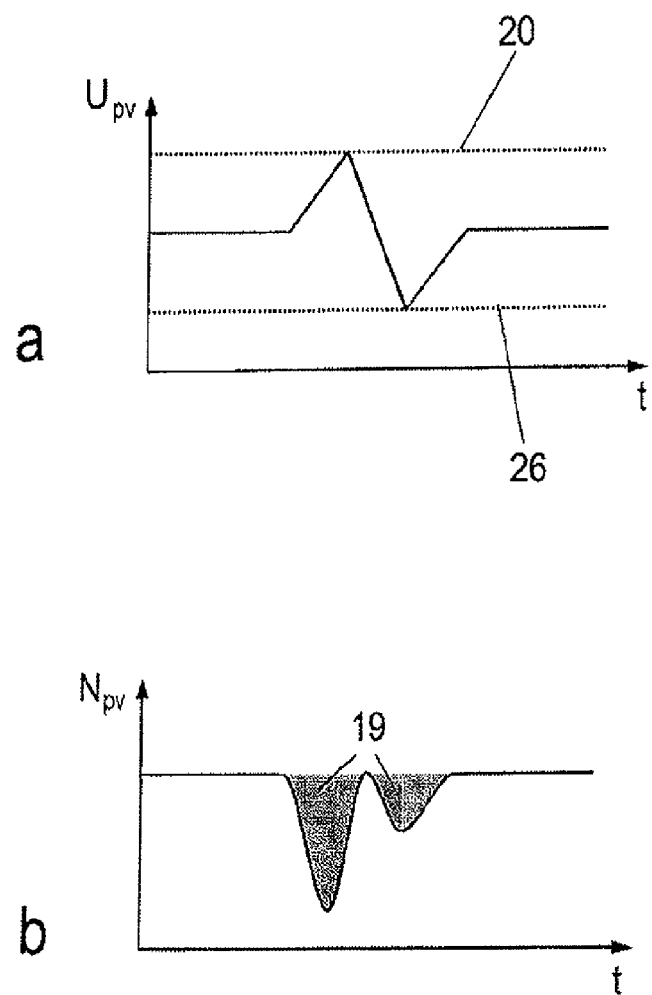
FIG. 3a shows a graphical illustration for an example of a temporal change in a voltage for a search for a global maximum power point MPP.
FIG. 3b shows a power curve corresponding to FIG. 3a for elucidating losses during a search.

In this respect, FIG. 3a shows a graphical illustration of a change in a voltage Upv over time t for a search for a global maximum power point MPP.

Such a search can be realized, for example, by stepping or ramping the PV voltage Upv up and down between a maximum search voltage 20 and a minimum limit search voltage 26 (analogously to this, the PV current Ipv can also be varied).

If a higher power point is found in this case, then it is possible to move to this point in a targeted manner after the search. Such a search leads to a temporary operation of the generator at reduced power, and thus to the loss of an obtainable energy yield depending on the search duration, the frequency of the search and the search area. This lost energy yield is illustrated as power loss 19 in FIG. 3b in a power Ppv corresponding to FIG. 3a over time.

By means of a method according to the invention, which is shown as a flowchart in FIGS. 4a and 4b and then described comprehensively below, the power loss 19 during a search for a higher point, or for the global maximum power point MPP, is minimized by intelligent limiting of the search area.

A limitation of the search area can generally be realized by a continuously monitored termination criterion being satisfied, but also by a predetermined value of a parameter being attained during the progression of the method.

Figure 4A:
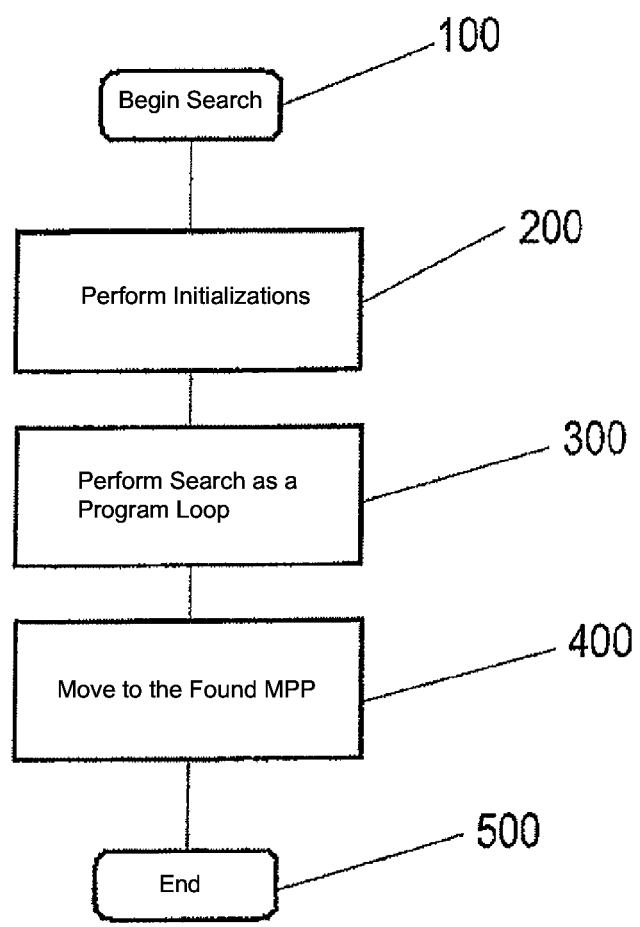
FIG. 4a shows a flowchart of a first embodiment of a method according to the invention for finding a maximum power point MPP.

FIG. 4a shows a flowchart of a first example embodiment of a method according to the invention for finding a maximum power point MPP.

In a first method step 100, a search is begun, wherein different boundary conditions are defined, in particular a start point. The start point can be a value that was determined during a last search, in one embodiment. However, it can also lie anywhere on the PU characteristic curve 10, 11 from FIG. 2; furthermore, it can also be calculated.

In a second method step 200, initializations are performed, such as, for example, the setting of the start voltage or of the start current for the search at the DC/DC converter.

A third method step is designated at 300, in which a search is carried out as a program loop. Here, at least one search area limitation is also checked or generated and checked as termination conditions for the program loop.

Method step 400 involves moving to a maximum power point MPP found and/or storing it for further applications.

Finally, the method is ended in method step 500.

Figure 4B:
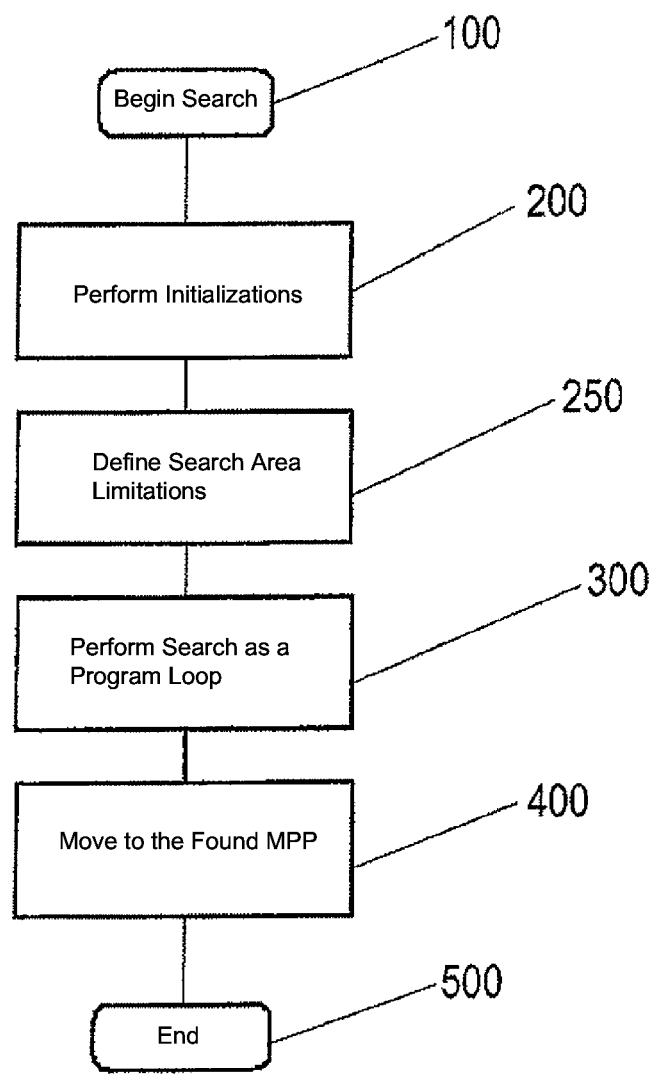
FIG. 4b shows a flowchart of a second embodiment of the method according to the invention for finding a maximum power point MPP.

FIG. 4b indicates a flowchart of a second example embodiment of the method according to the invention for finding a maximum power point MPP.

In contrast to the first example embodiment, here an additional method step 250 involves defining search area limitations before a search and/or determining a search direction.

Various advantageous search area limitations will now be explained which, when taken into account individually or else partly in combination, can simplify and shorten the search for an MPP point.

The principle in the search area limitation on account of a possible range of higher power is as follows:

During the search for a higher power point, by virtue of the use of at least one or more defined criteria as a termination condition in each step a check is made to determine whether, in the event of the search direction being maintained, there is a prospect of a power increase. If this is not the case, then the search is terminated.

A description will be given firstly of the termination conditions in each case for a right-hand search 5 and a left-hand search 6.

The derivation of the termination condition in the right-hand search 5 is illustrated with reference to FIG. 5.

The curve having the reference symbol 12 is here the maximum power found previously.

All value pairs composed of PV voltage Upv and PV current Ipv on the curve 12, multiplied by one another, produce the same power.

The curve 12 is updated upon a higher power being found during the search.

A maximum search voltage 20 and a maximum search current 30 delimit a search area and are dependent on the photovoltaic generator PV, the technical data of an inverter (not shown) connected downstream of the photovoltaic generator PV, and also, if appropriate, on the operating state thereof.

A start point 4 illustrated here can be a global or local maximum power point MPP, and also any point on the IU characteristic curve of the photovoltaic generator PV, which characteristic curve is depicted here as a dashed actual characteristic curve 11.

The point of intersection of the actual characteristic curve 11 with Upv indicates the open-circuit voltage 21 (Ipv=0) of the photovoltaic generator PV, and the point of intersection of the actual characteristic curve 11 with the axis Ipv is the short-circuit current 31 (Upv=0).

In the right-hand search 5, proceeding from a start voltage 22 at the start point 4, a higher power point can only lie on the right-hand side of the voltage.

Furthermore, a higher power point can only lie above the curve having the maximum power 12 found previously.

Owing to physical dictates, in the case of a PV module or in the case of a photovoltaic generator, the current cannot rise in the event of the PV voltage being raised, it can remain constant maximally.

On account of this, a higher power point can only lie on the present or below the present PV current Ipv.

Proceeding from the start voltage 22, this results in the power range 13 illustrated in dotted fashion as a possible area for a higher power point.

If the PV current Ipv, during the right-hand search 5, falls below the current at the point of intersection (right-hand search end point 40), of the maximum search voltage 20 and the line having the maximum power 12 found previously, then the search can be terminated in the case of a right-hand termination current 33 and the associated right-hand termination voltage 23, since the possible area of higher power has become unattainable.

In order to clarify this, the dashed (unknown) IU characteristic curve (actual characteristic curve 11) of a shaded PV module or photovoltaic generator is depicted. In this example, the search area for the right-hand search 5 was reduced to approximately half of the voltage range from the start voltage 22 up to the search voltage 20.

The corresponding termination condition results, in the case of current or voltage predefinition, as:

$$Ipv < P\max/U\text{search} \quad (G01)$$

where
Ipv:=present PV current,
Pmax:=maximum power found during the search, and
Usearch:=maximum search voltage (or maximum tracking voltage or maximum inverter PV voltage).

Figure 6A:
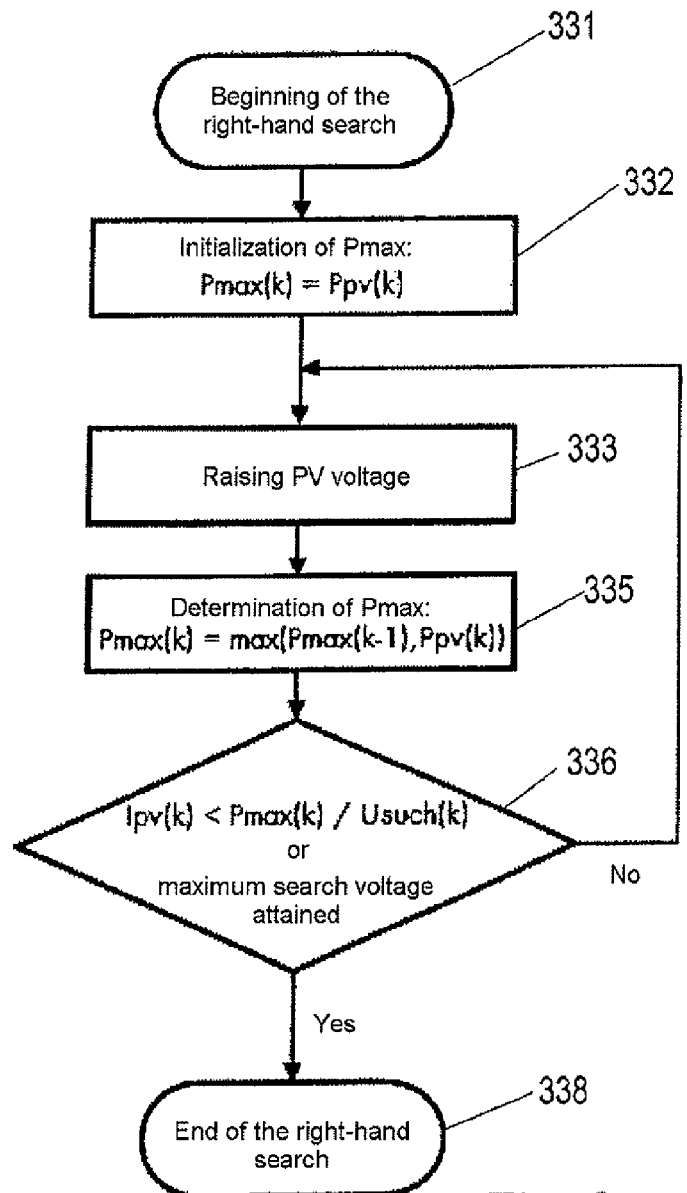
FIG. 6a shows an example flowchart for a right-hand search with voltage predefinition.

A corresponding flowchart is shown in FIG. 6a for a right-hand search 5 given a voltage predefinition. Upon a higher power being found, the present operating point is set and stored in one embodiment.

The following holds true in this case:
k:=running index,
Ipv:=present PV current,
Ppv:=present PV power,
Pmax:=maximum power found during the search, and
Usearch:=maximum search voltage (or maximum tracking voltage or maximum inverter PV voltage).

Step 331 designates the start of a right-hand search.

Step 332 designates an initialization of the maximum power Pmax where Pmax(k)=Ppv(k) at the start point Ppv(0). A program loop is then started.

At step 333, the voltage Upv is then increased (maximally up to the search voltage 20) in one step, e.g. as a step on a rising ramp.

At step 335, a check is made by means of a comparison to determine whether, at the present point Pmax(k) moved to by means of a voltage increase, with the presently determined power value Ppv(k), a higher power point than at the point moved to previously, Pmax(k−1), has been attained:

$$P\max(k) = \max(P\max(k-1), Ppv(k)).$$

A check is then made in a comparison step 336 to determine whether a termination condition $$Ipv(k) < P\max(k)/U\text{search}(k)$$

is met or the maximum search voltage 20 has been attained.

If this is not the case, the method jumps back to step 333 and the voltage is increased further and a better maximum power point MPP continues to be sought.

The illustration does not show that in the event of a higher power being found, the present operating point is stored.

If a maximum power point MPP having a higher power is found, then it is stored as the present operating point and can be moved to in a further step. If the maximum search voltage 20 has been attained or the termination condition is met, without a higher MPP being found, then the previous or last MPP found is maintained.

The search is ended at step 338.

Figure 6B:
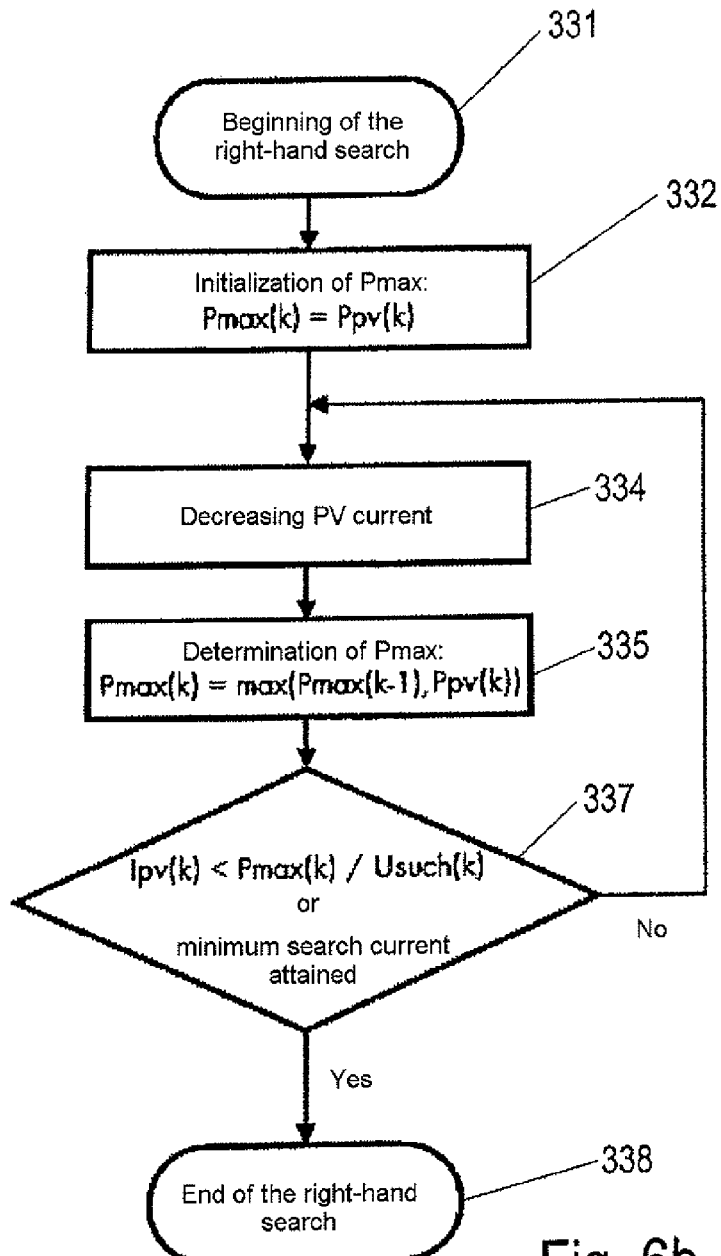
FIG. 6b shows an example flowchart for a right-hand search with current predefinition.

Instead of a voltage predefinition, a current predefinition can also be effected with respect to the right-hand search 5. This is shown in FIG. 6b in an example flowchart for a right-hand search 5 with current predefinition.

The following likewise holds true in this case:
k as running index,
Ipv:=present PV current,
Ppv:=present PV power,
Pmax:=maximum power found during the search, and
Usearch:=maximum search voltage (or maximum tracking voltage or maximum inverter PV voltage).

At step 331, the right-hand search begins.

The initialization of Pmax where Pmax(k)=Ppv(k) is specified by a step 332.

A search program loop, possibly to be multiply iterated, is then started.

In this case, firstly in step 334, the current Ipv is decreased in one step.

Afterward, in step 335, the power Pmax is again determined: Pmax(k)=max(Pmax(k−1), Ppv(k)).

At comparison step 336 a check is made to determine whether the termination condition $$Ipv(k) < P\max(k)/U\text{search}(k)$$

is met or the minimum search current has been attained.

If an MPP having a higher power is found, then it is stored as the present operating point and can be moved to in a further step. If the minimum search current has been attained or if the termination condition is met, without a higher MPP being found, then the previous or last MPP found is maintained.

The search is ended at step 338.

FIG. 7 indicates an example graphical illustration for explaining the derivation of the termination condition in the left-hand search 6. The curve having the reference symbol 12 is once again the maximum power found previously. All value pairs composed of PV voltage Upv and PV current Ipv on this curve produce, when multiplied by one another, the same power. In this case, too, the maximum power 12 is updated in the event of a higher power being found during the search. A maximum search voltage 20 and a maximum search current 30 delimit the search area and are dependent on the technical data of an inverter (not shown) connected downstream of the photovoltaic generator PV, and, if appropriate, on the operating state thereof. The start point 4 illustrated here can be a global or local maximum power point MPP, and also any point on the IU characteristic curve of the photovoltaic generator PV.

In the left-hand search 6, proceeding from the start voltage 22 at the start point 4, a higher power point can only lie on the left-hand side of the start voltage 22.

Furthermore, a higher power point can only lie above the maximum power 12 found previously. The maximum search current 30 further limits the possible area of higher power. Proceeding from the start voltage 22 at the start point 4, this results in the possible power range 13 illustrated in a dotted manner for a higher power point. If, during the left-hand search, Upv falls below the voltage at the point of intersection of the maximum search current 30 and the line having the maximum power 12 found previously at a left-hand search end point 41, then the search can be terminated in the case of a left-hand termination voltage 24.

The corresponding termination condition results, in the case of current or voltage predefinition, as:

$$Upv < P\max/I\text{search} \quad (G02)$$

Where:
Upv:=present PV voltage,
Pmax:=maximum power found during the search, and
Isearch:=maximum search current (or maximum inverter PV current).

At this juncture it is additionally possible to define a lower limit for the search voltage.

Figure 8A:
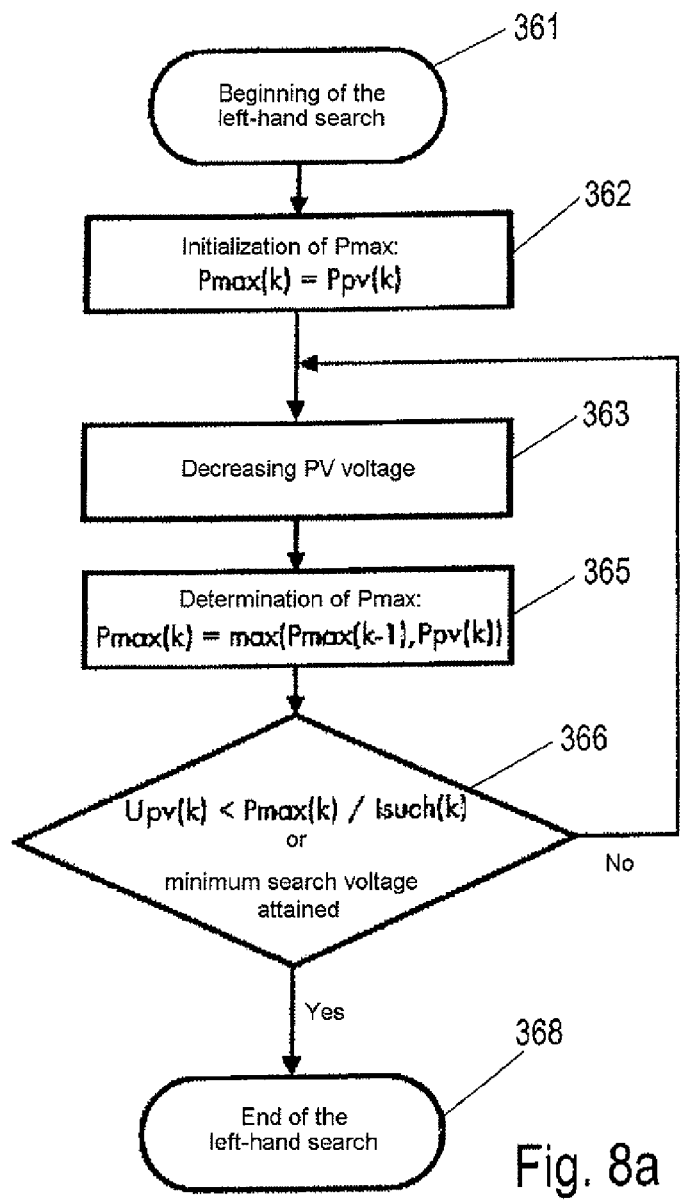
FIG. 8a shows an example flowchart for a left-hand search with voltage predefinition.

FIG. 8a shows, for this purpose, an example flowchart for a left-hand search with voltage predefinition. The illustration does not show here that, in the event of a higher power being found, the present operating point is stored.

The following holds true in this case:
k is a running index,
Upv:=present PV voltage,
Ppv:=present power,
Pmax:=maximum power found during the search, and
Isearch:=maximum search current (or maximum inverter PV current).

At step 361, a left-hand search begins. Step 362 indicates an initialization of Pmax where Pmax(k)=Ppv(k).

Then, at step 363, in a loop possibly to be multiply iterated, the voltage Upv is decreased in k steps, e.g. in a ramp, to a minimum search voltage.

During iteration of the loop, Pmax is then in each case determined at step 365: Pmax(k)=max(Pmax(k−1), Ppv(k)).

In comparison step 366, a termination condition:

$$Upv(k) < Pmax(k)/Isearch(k)$$

is checked.

A check is also made to determine whether the minimum search voltage has been attained. If this is not the case, the method jumps back to step 363 and the voltage is decreased further.

If an MPP having a higher power is found, then it is stored as the present operating point and can be moved to in a further step. If the minimum search voltage has been attained or if the termination condition is met, without a higher MPP being found, then the previous or last MPP found is maintained.

The search is ended at step 368.

Figure 8B:
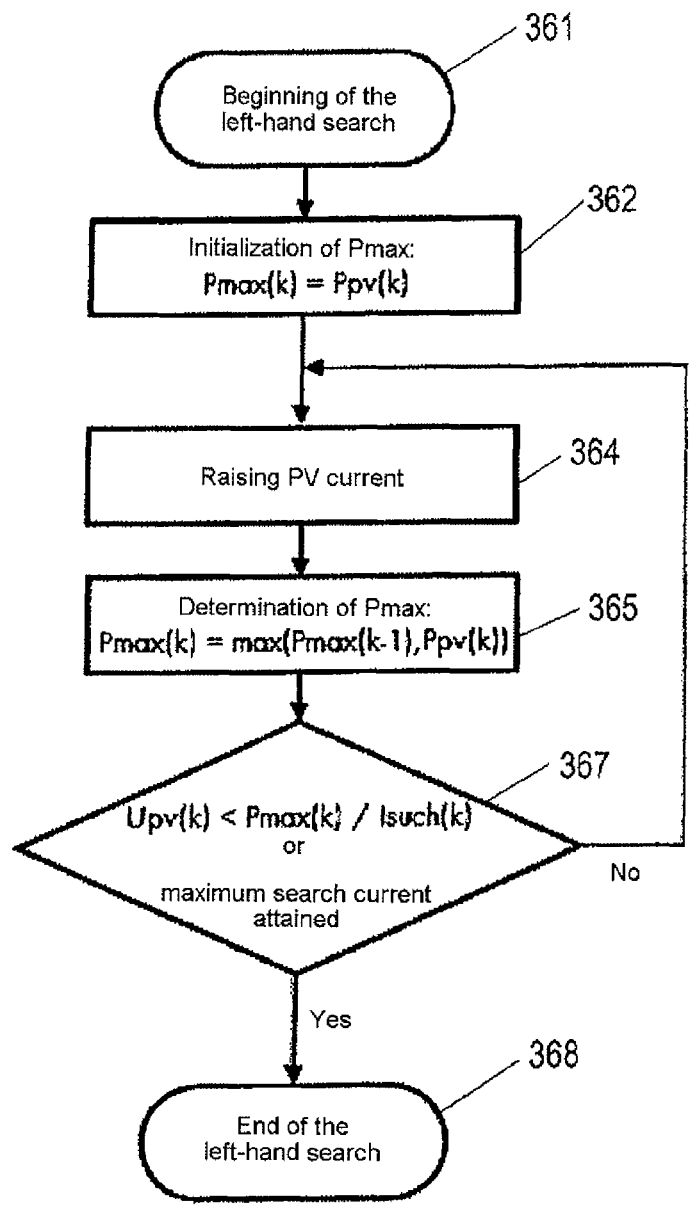
FIG. 8b shows an example flowchart for a left-hand search with current predefinition.

Instead of a voltage predefinition, a current predefinition can also be effected with respect to the left-hand search. This is shown in an example flowchart for a left-hand search with current predefinition in FIG. 8b.

The following holds true here, too:
k as running index,
Ipv:=present PV current,
Ppv:=present PV power,
Pmax:=maximum power found during the search, and
Usearch:=maximum search voltage (or maximum tracking voltage or maximum inverter PV voltage).

The left-hand search begins at step 361. The initialization of Pmax where Pmax(k)=Ppv(k) is specified by step 362.

Then, in a loop 364, the current Ipv is increased in k steps, i.e. in a ramp, up to a maximum search current 30. At step 365, in the loop in each case Pmax is again determined: Pmax(k)=max(Pmax(k−1), Ppv(k)). In comparison step 367, in the loop a check is then made to determine whether the termination condition $$Upv(k) < Pmax(k)/Isearch(k)$$

of the loop is met or the maximum search current 30 has been attained.

If a maximum power point MPP having a higher power is found, then it is stored as the present operating point and can be moved to in a further step. If the maximum search current 30 has been attained or if the termination condition is met, without a higher maximum power point MPP being found, then the previous or last maximum power point MPP found is maintained.

At step 368, the left-hand search is ended.

A further limitation of a search area can be effected by account of the rated power of the connected string.

On account of the profile of an IU characteristic curve it is physically impossible for the maximum search current 30 to flow in the case of the maximum search voltage 20, and vice versa. If the rated power or the maximum power at full load of the photovoltaic generator connected to the string to be searched is known, then the maximum search voltage 20 and the maximum search current 30 can already be reduced in advance on the basis of this knowledge. These new limit values determined on the basis of the rated power, in this case the maximum search voltage designated as rated search voltage 25 (will be explained in even greater detail further below) and the correspondingly determined maximum search current, designated here as rated search current 35, can then be used under the determined termination conditions described above. This measure further limits the search area, primarily during operation of the relevant string near the maximum power. The information about the rated power can, for example, be directly predefined by the installation operator or by the fitting engineer or be determined from the operating data of the relevant strings. In inverters in which the maximum permitted string power is less than the maximum (rated) search voltage multiplied by the maximum (rated) search current, alternatively it is also possible to use the maximum permitted string power instead of the rated power connected to the relevant string.

Firstly, the right-hand search 5 will be explained.

If an unshaded PV module or photovoltaic generator in rated operation is initially assumed, then the maximum voltage up to which searching has to be effected in this case is calculated as follows:

$$Usearch = Prated/Impp \quad (G03)$$

where:
Usearch:=maximum search voltage,
Prated:=rated power of the photovoltaic generator connected to the string to be searched, and
Impp:=PV current at the maximum power point.

However, this approach is valid only in rated operation and with an unshaded photovoltaic generator.

FIG. 9 shows a graphical illustration for elucidating a maximum power point MPP 1 in the case of an unshaded IU characteristic curve, which here is also designated as the rated characteristic curve 10. The reference symbol 12 indicates the curve of constant power on which the maximum power point 1 lies.

In order to obtain a generally valid formula, the current Impp has to be replaced by the current before the search. The latter can be maximally the short-circuit current 31 of the connected photovoltaic generator. In this case, the associated current at the maximum power point (maximum power point MPP) 1 would be, in the case of silicon cells, for example, typically approximately 90% of the short-circuit current 31 and is indicated in FIG. 9 as the rated search current with the reference symbol 35. In order to obtain a generally valid formula which is valid for any start point of the search, this case has to be formulated. For the example of silicon cells it follows that:

$$U'search = Prated/(Istart*0.9) \quad (G04)$$

where:
U'search:=maximum search voltage relative to the rated power,
Prated:=rated power of the photovoltaic generator connected to the string to be searched, and
Istart:=PV current Ipv before the search.

It follows independent of the cell type that:

$$U'search := Prated/(Istart*ki) \quad (G05)$$

Where:
U'search:=maximum search voltage relative to the rated power,
Prated:=rated power of the photovoltaic generator connected to the string to be searched,
ki:=for instance factor MPP current/short-circuit current in the case of corresponding cell type, and
Istart:=PV current Ipv before the search.

This formula is generally valid. In the case of weaker irradiation, for example, or in the case of a shaded PV module or photovoltaic generator, the short-circuit current 31, or the current before the beginning of the search, correspondingly decreases. The maximum search voltage is then correspondingly expanded and a resulting MPP on the right-hand side of the maximum power point MPP 1 in rated operation can likewise be found.

In order to avoid expansion of the maximum search voltage relative to the rated power U'search greater than the maximum search voltage Usearch, the minimum of U'search and Usearch should be inserted into the termination condition (G01).

It thus follows for the extended termination condition that:

$$Ipv<Pmax/\min(U'\text{search},U\text{search}) \tag{G06}$$

$$Ipv<Pmax/\min(Prated/(Istart*ki),U\text{search}) \tag{G07}$$

Where:
Ipv:=present PV current,
Pmax:=maximum power found during the search,
Usearch:=maximum search voltage (or maximum tracking voltage or maximum inverter PV voltage),
U'search:=maximum search voltage relative to the rated power,
Prated:=rated power of the photovoltaic generator connected to the string to be searched,
ki:=for instance factor MPP current/short-circuit current in the case of corresponding cell type, and
Istart:=PV current before the search.

The search area limitation on account of the rated power of the connected PV module or photovoltaic generator is illustrated graphically in FIG. 10. On account of the maximum search voltage calculated from the connected rated power of the photovoltaic generator, the search voltage being designated as the rated search voltage 25, the possible range of higher power is limited further in the case illustrated. This can be recognized by the fact that the rated search voltage 25 intersects the maximum power 12 at a right-hand search end point 40' lying on the left before the previous right-hand search end point 40. On account of the profile of the maximum power 12, the current at which the search is ended is then higher. The search area has therefore likewise been limited further. A start current is designated by 32; the reference symbol 23 indicates the right-hand termination voltage now lying further on the left.

In an optional variant, when deriving all of the termination conditions and search area limitations mentioned here, it is possible to modify the formulated assumption that the current at best remains constant (or decreases) upon continuation of the right-hand search. One simple modification is provided by assuming, instead of a constant current, a current profile in which the current increases linearly as the voltage rises. The same modification can equally be implemented for the voltage. In this case, the magnitude of the gradient is designated by a factor m_Ipv, for the gradient of the current Ipv, or m_Upv, for the gradient of the voltage Upv. The abovementioned conditions G01 and G02 are then modified as:

$$Ipv<Pmax/Usearch+m\_Ipv*(Usearch-Upv) \tag{G01'}$$

$$Upv<Pmax/Isearch+1/m\_Upv*(Isearch-Ipv) \tag{G02'}.$$

In a generalization of the modifying concept, the assumption of constant current is replaced by any desired model current profile. In this case, the model current profile Imodel (U) represents a current prediction as a function of the continued search voltage, that is to say defines a prognosis for a current value to which the current Ipv will at least have fallen upon a (higher) voltage U being obtained. A profile Imodel (U) can, for example, be determined from a typical ideal characteristic curve of a photovoltaic generator PV, or else be determined by a model profile on the basis of parameters such as series resistance and parallel resistance of an ideal PV generator. In this generalized case, the right-hand search 5 is terminated when, between Upv and Usearch (or Usearch'), no voltage value Uintermediate exists for which the following holds true:

$$Pmax<U\text{intermediate}*Ipv*I\text{model}(U\text{intermediate})/I\text{model}(Upv) \tag{G01''}.$$

The following modified termination criterion can analogously be used for the left-hand search:

$$Upv<Pmax/Isearch*I\text{model}(U=0)/I\text{model}(Upv) \tag{G02''}.$$

Where:
Ipv:=present PV current,
Pmax:=maximum power found during the search,
Usearch:=maximum search voltage (or maximum tracking voltage or maximum inverter PV voltage),
Imodel (U):=model current profile as a function of the voltage U,
m_Ipv:=linear factor by which the assumed current decreases as the voltage rises,
m_Upv:=linear factor by which the assumed voltage decreases as the current rises.

Furthermore, the case can occur in which, during the search, part of the generator characteristic curve is attained at which, although the theoretical obtainability of a higher value of the generator power is still afforded, the stated termination criteria are therefore not yet satisfied. If a possible operating point lies, however, only slightly above the power already attained, the operating point lies in the vicinity of the edge of the search area, or the probability of the existence of the operating point is only low, it would be desirable for the search nevertheless not to be continued further in such a situation. One possibility for realizing this desire is to use in the described termination criteria, instead of a power Pmax already attained, a power value Pmax' increased by a magnitude or a factor, for example. In this case, the left-hand or right-hand search is terminated correspondingly earlier, namely when it becomes impossible for the increased power value still to be realized upon continuation of the search.

Figure 11A:
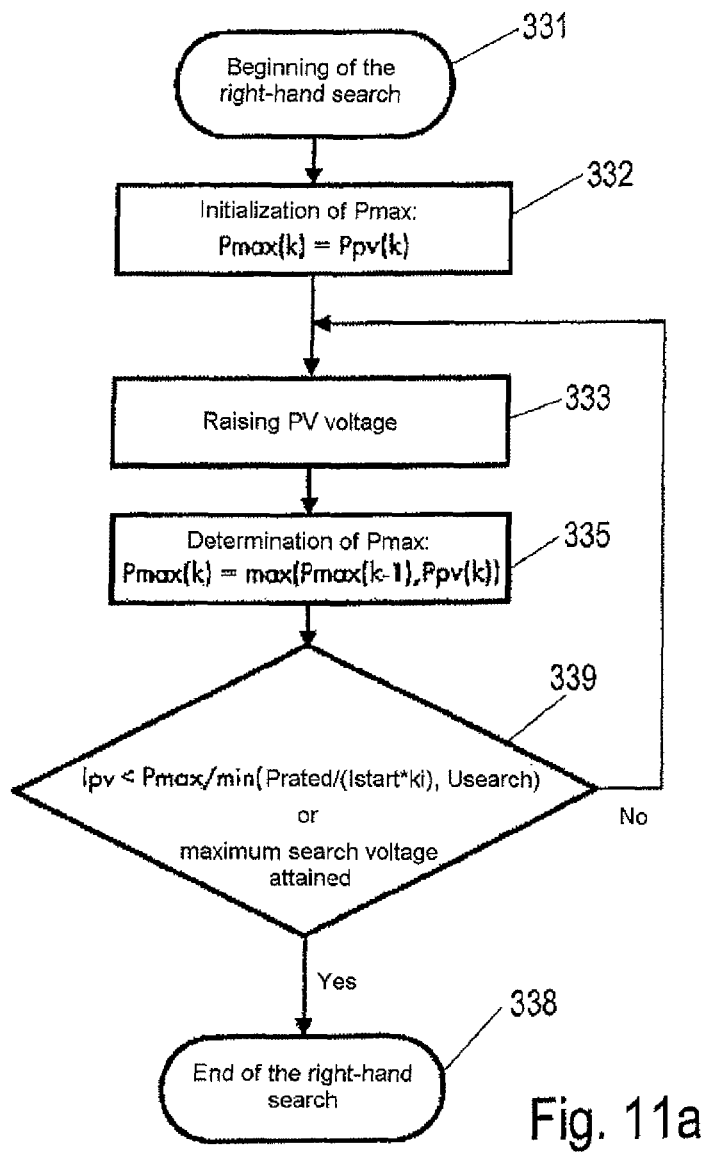
FIG. 11a shows an example flowchart for a right-hand search when taking account of the rated power of the connected PV generator with voltage predefinition according to FIG. 10.

FIG. 11a shows the flowchart in the case of voltage predefinition (not illustrated: in the event of a higher power being found, the present operating point is stored) for a right-hand search 5.

The following hold true in this flowchart:
Ipv=present PV current,
Ppv=present PV voltage,
Pmax=maximum power found during the search,
Usearch=maximum search voltage (or maximum tracking voltage or maximum inverter PV voltage),
Prated=rated power of the photovoltaic generator connected to the string to be searched, ki:=for instance factor MPP current/short-circuit current in the case of corresponding cell type, and
Istart:=PV current before the search.

At step 331, the right-hand search begins. An initialization of Pmax where Pmax(k)=Ppv(k) is specified at step 332. Then, in a loop at step 333 the voltage Upv is increased in k steps, e.g. in a ramp, up to maximally the search voltage 20.

At step 335, in each case Pmax is determined: Pmax(k)=max(Pmax(k−1), Ppv(k)). At comparison step 339, a check is made to determine whether the termination condition $$Ipv<Pmax/\min(Prated/(Istart*ki),Usearch)$$

is met or the maximum search voltage 20 has been obtained. If this is not the case, the method jumps back to step 333 and the voltage is increased further. If an MPP having a higher power is found, then it is stored as the present operating point and can be moved to in a subsequent step. If the maximum search voltage 20 has been attained or if the termination condition is met, without a higher MPP being found, then the previous or last MPP found is moved to.

The search is ended at step 338.

Figure 11B:
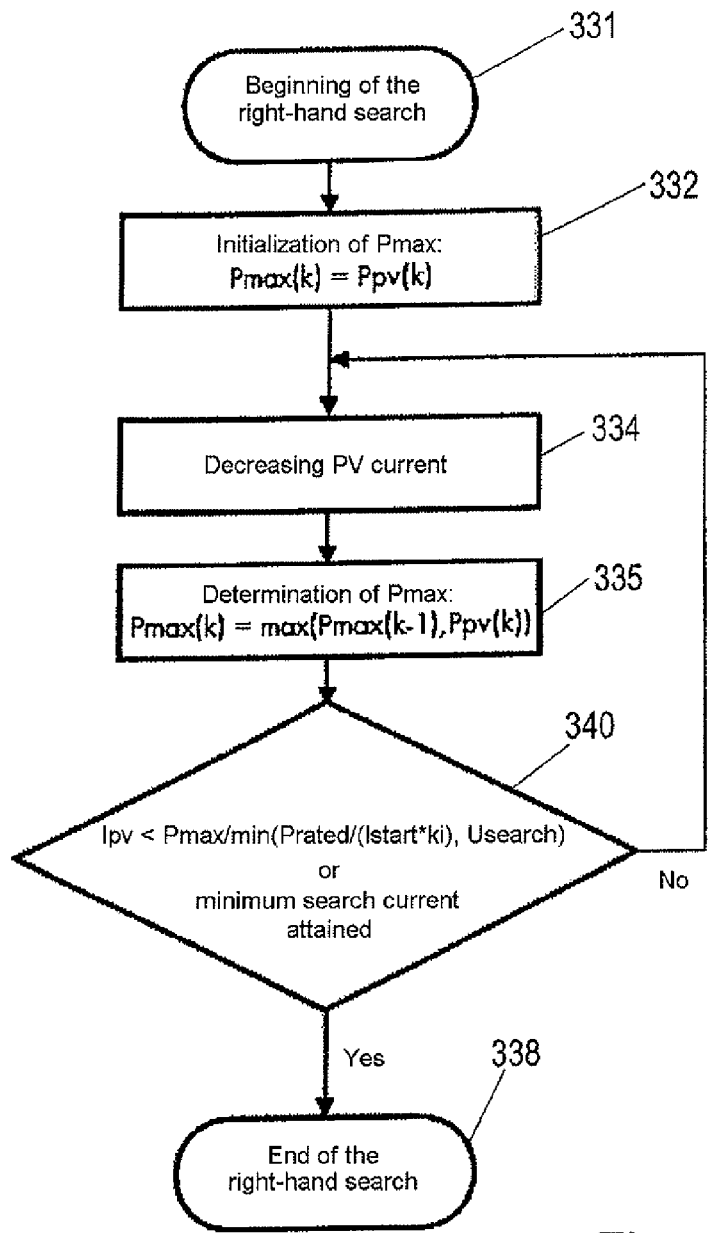
FIG. 11b shows an exemplary flowchart for a right-hand search when taking account of the rated power of the connected PV generator with current predefinition according to FIG. 10.

The corresponding flowchart arises in the case of current predefinition (the illustration does not show that, in the event of a higher power being found, the present operating point is stored), as is illustrated in FIG. 11*b* for a right-hand search 5 with current predefinition.

In this case, the following hold true:
Ipv:=present PV current,
Ppv:=present PV voltage,
Pmax:=maximum power found during the search,
Usearch:=maximum search voltage (or maximum tracking voltage or maximum inverter PV voltage),
Prated:=rated power of the photovoltaic generator connected to the string to be searched,
ki:=for instance factor MPP current/short-circuit current in the case of corresponding cell type, and
Istart:=PV current before the search.

Step 331 indicates the beginning of the right-hand search. At step 332, an initialization of Pmax where Pmax(k)=Ppv(k) is specified. Then, at step 334 the current Ipv is decreased in k steps, e.g. in a ramp, to a minimum search current. At step 335, Pmax is determined: Pmax(k)=max(Pmax(k−1), Ppv (k)).

At comparison step 340, a check is made to determine whether the termination condition $$Ipv<Pmax/\min(Prated/(Istart*ki),Usearch)$$

is met or a minimum search current has been attained. If this is not the case, the method jumps back to step 334 and the current is decreased further.

If an MPP having a higher power is found, then it is stored as the present operating point and can be moved to in a further step. If the minimum search current has been attained or if the termination condition is met, without a higher MPP being found, then the previous or last MPP found is maintained.

The search is ended at step 338.

The description of the left-hand search 6 will now follow.

If an unshaded PV module or photovoltaic generator in rated operation is again initially assumed, then the maximum current up to which searching has to be effected in this case is calculated as follows:

$$Isearch=Prated/Umpp$$

Where:
Isearch:=maximum search current,
Prated:=rated power of the photovoltaic generator connected to the string to be searched, and
Umpp:=PV voltage at the maximum power point.

However, this approach is only valid in rated operation and with an unshaded photovoltaic generator. FIG. 12 shows a graphical illustration for elucidating a maximum power point MPP 1 in the case of an unshaded IU characteristic curve (rated characteristic curve 10). The reference symbol 12 indicates the curve of maximum power on which the maximum power point MPP 1 lies. In order to obtain a generally valid formula, the voltage Umpp has to be replaced by the voltage before the search. The latter can be maximally the open-circuit voltage 21 of the connected photovoltaic generator. In this case, the associated voltage at the maximum power point would be, in the case of silicon cells, for example, typically approximately 80% of the open-circuit voltage and is indicated here as rated search voltage 25. In order to obtain a generally valid formula which is valid for any start point of the search, this case can be formulated.

It follows for the example of silicon cells that:

$$I'search=Prated/(Ustart*0.8) \quad (G08)$$

Where:
I'search:=maximum search current relative to the rated power,
Prated:=rated power of the photovoltaic generator connected to the string to be searched, and
Ustart:=PV voltage before the search.

It follows independently of the cell type that:

$$I'search=Prated/(Ustart*ku) \quad (G09)$$

Where:
I'search=maximum search current relative to the rated power,
Prated:=rated power of the photovoltaic generator connected to the string to be searched,
ku:=for instance factor MPP voltage/open-circuit voltage in the case of corresponding cell type, and
Ustart:=PV voltage before the search.

This formula can be used broadly. In the case of weaker irradiation, for example, or in the case of a shaded PV module or photovoltaic generator, the short-circuit current 31, or the current before the beginning of the search, correspondingly decreases. The current I'search calculated here, relative to the connected rated power, then lies above the actual current at the maximum power point.

In order to avoid expansion of the maximum search current relative to the rated power I'search greater than the maximum search current Isearch, the minimum of I'search and Isearch should be inserted into the termination condition (G02).

The extended termination condition follows:

$$Upv<Pmax/\min(I'search,Isearch) \quad (G10)$$

$$Upv<Pmax/\min(Prated/(Ustart*ku),Isearch) \quad (G11)$$

In this case the following hold true:
Upv:=present PV voltage,
Pmax:=maximum power found during the search,
Isearch:=maximum search current (or maximum inverter PV current),
I'search:=maximum search current relative to the rated power,
Prated:=rated power of the photovoltaic generator connected to the string to be searched,
ku:=for instance factor MPP voltage/open-circuit voltage in the case of corresponding cell type, and
Ustart:=PV voltage before the search.

The search area limitation on account of the rated power of the connected PV module or photovoltaic generator is illustrated graphically in FIG. 13 for the left-hand search 6. On account of the maximum search current, calculated from the connected rated power of the photovoltaic generator, the possible range of higher power is limited further in the case illustrated. The corresponding search area was therefore likewise limited further. This can be recognized by the fact that the rated search current 35 intersects the maximum power 12 at a left-hand search end point 41' lying below the previous left-hand search end point 41. The start voltage at the start point 4 is designated by 22; the reference symbol 24 indicates a left-hand termination voltage.

Figure 14A:
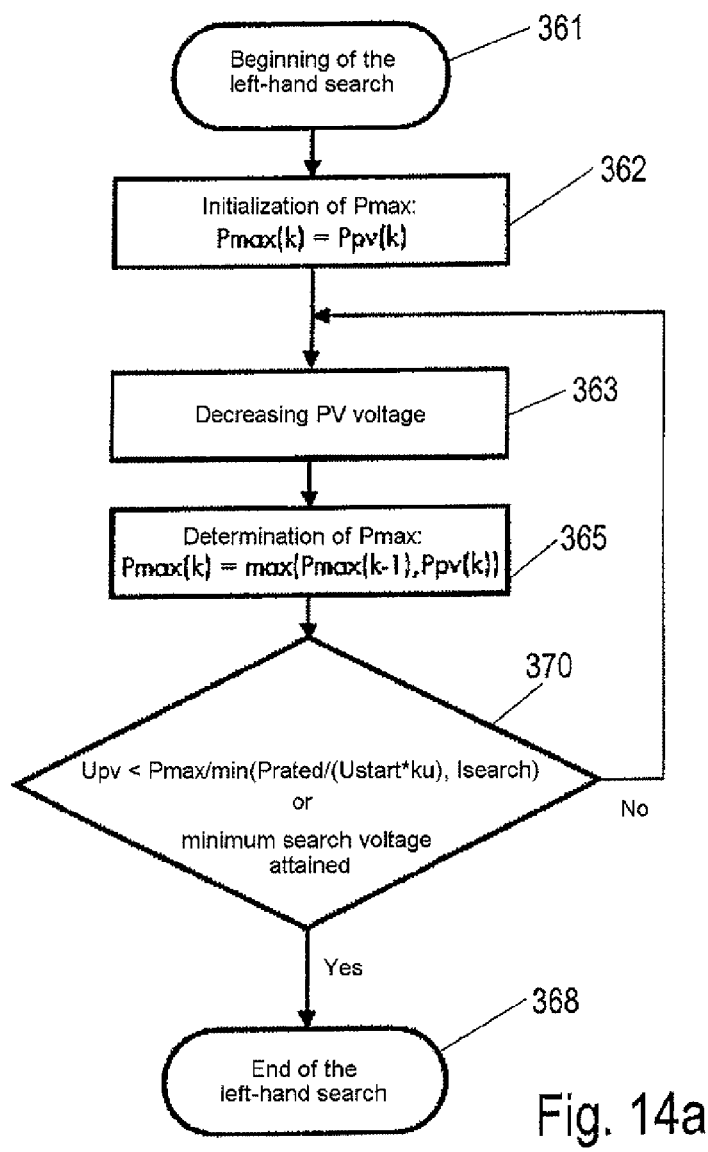
FIG. 14a shows an example flowchart for a left-hand search when taking account of the rated power of the connected PV generator with voltage predefinition according to FIG. 13.

The corresponding flowchart is shown in the case of voltage predefinition (the illustration does not show that, in the event of a higher power being found, the present operating point is stored) in FIG. 14a for the left-hand search 6.
Where:
Upv:=present PV voltage,
Ppv:=present PV power,
Pmax:=maximum power found during the search,
Isearch:=maximum search current (or maximum inverter PV current),
Prated:=rated power of the photovoltaic generator connected to the string to be searched,
ku:=for instance factor MPP voltage/open-circuit voltage in the case of corresponding cell type, and
Ustart:=PV voltage before the search.

At step 361, the left-hand search begins. At step 362, an initialization of Pmax where Pmax(k)=Ppv(k) is specified. At step 363, the voltage Upv is decreased in k steps, e.g. in a ramp, to a minimum search voltage. At step 365, Pmax is determined: Pmax(k)=max(Pmax(k−1), Ppv(k)).

At comparison step 370, a check is made to determine whether the termination condition $$Upv<P\mathrm{max}/\mathrm{min}(P\mathrm{rated}/(U\mathrm{start}*ku),I\mathrm{search})$$

is met or the minimum search voltage has been attained. If this is not the case, the method jumps back to step 363 and the voltage is decreased further.

If an MPP having a higher power is found, then it is stored as the present operating point and can be moved to or set in a further step. If the minimum search voltage has been attained or if the termination condition is met, without a higher MPP being found, then the previous or last MPP found is maintained.

The search is ended at step 368.

Figure 14B:
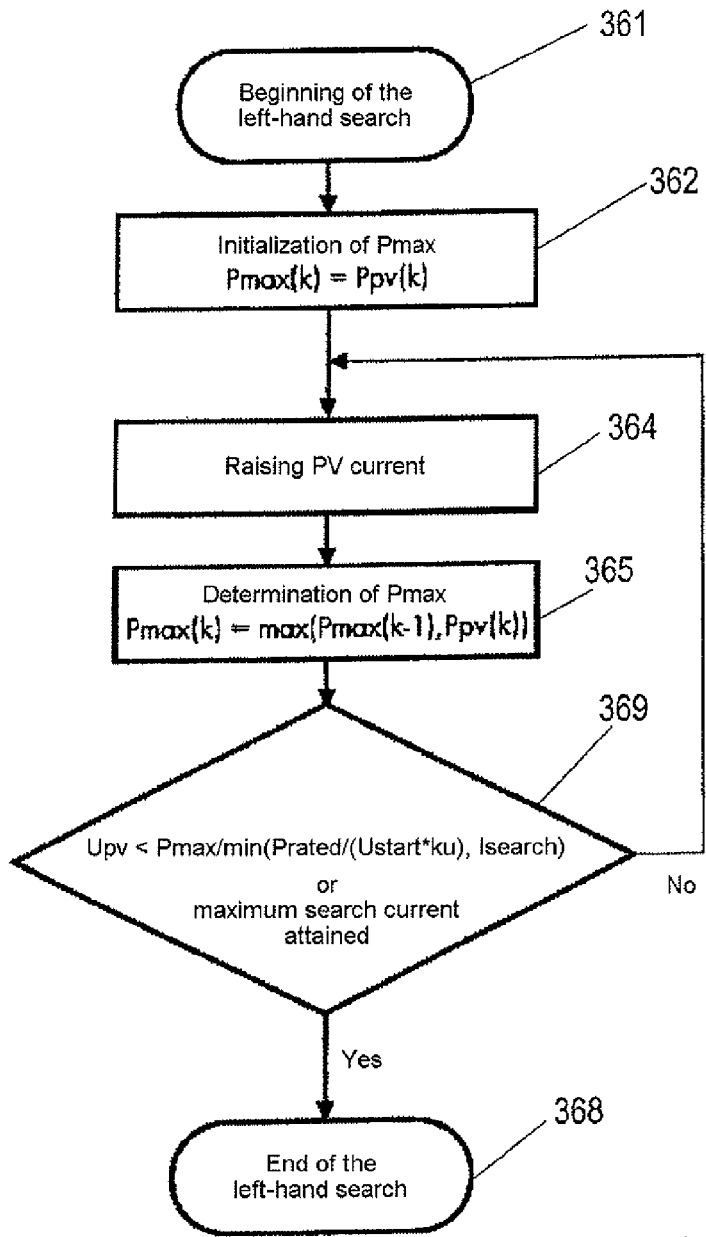
FIG. 14b shows an example flowchart for a left-hand search when taking account of the rated power of the connected PV generator with current predefinition according to FIG. 13.

The corresponding flowchart arises in the case of current predefinition (not illustrated: in the event of a higher power being found, the present operating point is stored), as is illustrated in FIG. 14b.

In this flowchart, the following terms are used:
Upv:=present PV voltage,
Ppv:=present PV power,
Pmax:=maximum power found during the search,
Isearch:=maximum search current (or maximum inverter PV current),
Prated:=rated power of the photovoltaic generator connected to the string to be searched,
ku:=for instance factor MPP voltage/open-circuit voltage in the case of corresponding cell type, and
Ustart:=PV voltage before the search.

At step 361, the left-hand search begins. At step 362, an initialization of Pmax where Pmax(k)=Ppv(k) is effected. At step 364, the search current Ipv is increased in k steps, e.g. in a ramp, up to a maximum search current.

At step 365, Pmax is determined: Pmax(k)=max(Pmax(k−1), Ppv(k)).

At comparison step 369, a check is made to determine whether the termination condition $$Upv<P\mathrm{max}/\mathrm{min}(P\mathrm{rated}/(U\mathrm{start}*ku),I\mathrm{search})$$

is met or the maximum search current (e.g. 20) has been attained. If this is not the case, the method jumps back to step 364 and the search current is increased further. If an MPP having a higher power is found, then it is stored as the present operating point and can be moved to or set in a further step. If the maximum search current has been attained or if the termination condition is met, without a higher MPP being found, then the previous or last MPP found is maintained.

The search is ended at step 368.

A description is given below of how the search area can be limited further in order to ensure that a defined minimum power 14 is not undershot during the search. This is necessary primarily when the power required for operating the PV inverter is only obtained by means of a PV string and is not intended or able to be obtained by means of the grid to be fed. Undershooting of the minimum power 14 required for operating the inverter during the search could then lead to a momentary failure of the inverter. In this case, the limitation is effected by decreasing the maximum search current or the maximum search voltage or by raising the minimum search current or the minimum search voltage, not by termination conditions.

The right-hand search 5 will be explained first.

In order to ensure that a defined minimum power 14 is not undershot during the right-hand search in conjunction with the termination conditions (G01) and (G02), the searchable area is additionally limited, if appropriate, depending on the present operating point.

The equation in the case of voltage predefinition will be derived first, and then the equation in the case of current predefinition.

Voltage predefinition (only in conjunction with termination criterion for right-hand search):

Generally, it is intended always to be ensured that the present power is greater than the minimum power:

$$Upv*Ipv>=P\mathrm{min}$$

Upv:=present PV voltage
Ipv:=present PV current
Pmin:=minimum allowed power during the search During the right-hand search, the search is terminated at the latest if:

$$Ipv<P\mathrm{max}/U\mathrm{search}$$

Ipv:=present PV current
Pmax:=maximum power found previously
Usearch:=maximum search voltage (or maximum tracking voltage or maximum inverter PV voltage)

It follows therefrom that the PV current is greater than or equal to the previously found power divided by the maximum search voltage:

$$Ipv>=P\mathrm{max}/U\mathrm{search}$$

Ipv:=present PV current
Pmax:=maximum power found previously
Usearch:=maximum search voltage (or maximum tracking voltage or maximum inverter PV voltage)

The PV current is therefore at least equal to the previously found power divided by the maximum PV search voltage. If this is inserted into the first-mentioned equation, it follows that:

$$Upv*P\mathrm{max}/U\mathrm{search}>=P\mathrm{min}$$

Upv:=present PV voltage
Pmax:=maximum power found previously
Usearch:=maximum search voltage (or maximum tracking voltage or maximum inverter PV voltage) and
Pmin=minimum allowed power during the search If it is now intended to calculate the maximum allowed search voltage depending on the present voltage, the minimum allowed power and the maximum power found previously, then it follows that:

$$U''\text{search}=Upv*P\text{max}/P\text{min} \tag{G12}$$

Where:
Upv:=present PV voltage,
Pmax:=maximum power found previously,
U"search:=maximum search voltage taking account of a defined minimum power, and
Pmin:=minimum allowed power during the search.

Taking account of the maximum search voltage Usearch, the maximum search voltage results as:

$$\text{maximum search voltage}=\min(U''\text{search},U\text{search}) \tag{G13}$$

$$\text{maximum search voltage}=\min(Upv*P\text{max}/P\text{min},U\text{search}) \tag{G14}$$

Where:
U"search:=maximum search voltage taking account of a defined minimum power,
Usearch:=maximum search voltage (or maximum tracking voltage or maximum inverter PV voltage),
Upv:=present PV voltage,
Pmax:=maximum power found previously, and
Pmin:=minimum allowed power during the search.

The abovementioned maximum search voltage should ideally be used as a limit value for the voltage predefinition during the search. However, it can also be inserted into the previously mentioned termination conditions for limiting the search area. The above-mentioned maximum search voltage is calculated anew in each step.

The specified equation for the voltage predefinition can also be used as a termination condition or limitation of the search area in the case of current predefinition.

The derivation of the corresponding limitation for the right-hand search and in the case of current predefinition is illustrated below with reference to FIG. 15.

The minimum power 14 allowed during the search is depicted as a curve of constant power. During the right-hand search 5, the voltage Upv of a PV module or of a photovoltaic generator cannot decrease owing to physical dictates. In order to calculate the minimum allowed current during the right-hand search 5, therefore, the voltage Upv has to be regarded as constant (worst case). The latter can then be vertically projected onto the minimum allowed power. The current at such a point of intersection limit search current 42, proceeding from the present operating point 4 with a start current 32, is the minimum allowed current during the right-hand search 5 if the predefined minimum power 14 is not permitted to be undershot. It is calculated as follows:

$$I''\text{searchmin}=P\text{min}/Upv \tag{G15}$$

Where:
I"searchmin:=minimum search current taking account of a defined minimum power,
Pmin:=minimum allowed power during the search, and
Upv:=present PV voltage.

Taking account of an additionally defined limit for the minimum search current during the search, the following arises for the desired value during the right-hand search:

$$\text{minimum search current}=\max(I''\text{searchmin},I\text{min}) \tag{G16}$$

$$\text{minimum search current}=\max(P\text{min}/Upv,I\text{min}) \tag{G17}$$

Where:
I"searchmin=minimum search current taking account of a defined minimum power,
Imin:=additionally defined limit for the minimum current,
Pmin:=minimum allowed power during the search, and
Upv:=present PV voltage.

The abovementioned minimum search current should ideally be used as a limit value for the current predefinition during the search and is designated as limit search current 36. It is calculated anew in each step.

The specified equation for the current predefinition can also be used as a termination condition or limitation of the search area in the case of voltage predefinition.

In order to ensure that a defined minimum power 14 is not undershot during the left-hand search 6, the searchable area is additionally limited, if appropriate, depending on the present operating point. For this purpose, the minimum allowed voltage during the search is raised, if appropriate.

The equation in the case of voltage predefinition is derived first, and then the equation in the case of current predefinition.

The derivation of the corresponding limitation for the left-hand search 6 is illustrated below with reference to FIG. 16.

The minimum power 14 allowed during the search is depicted as a curve of constant power. During the left-hand search 6, the current Ipv of a PV module or of a photovoltaic generator cannot decrease owing to physical dictates. In order to calculate the minimum allowed voltage during the left-hand search 6, therefore, the current Ipv has to be regarded as constant (worst case). The present current can then be projected vertically onto the minimum allowed power. The voltage at a point of intersection limit search voltage 43, proceeding from the present operating point 4, is the minimum allowed voltage (limit search voltage 26) during the left-hand search if the predefined minimum power is not permitted to be undershot. It is calculated as follows:

$$U''\text{searchmin}=P\text{min}/Ipv \tag{G18}$$

Where:
U"searchmin=minimum search voltage taking account of a defined minimum power,
Pmin=minimum allowed power during the search, and
Ipv=present PV current.

Taking account of an additionally defined limit for the minimum voltage during the search, the following arises for the desired value during the left-hand search:

$$\text{minimum search voltage}=\max(U''\text{searchmin},U\text{min}) \tag{G19}$$

$$\text{minimum search voltage}=\max(P\text{min}/Ipv,U\text{min}) \tag{G20}$$

Where:
U"searchmin=minimum search voltage taking account of a defined minimum power,
Umin=additionally defined limit for the minimum voltage,
Pmin=minimum allowed power during the search, and
Ipv=present PV current.

The abovementioned minimum search voltage (limit search voltage 26) should ideally be used as a limit value for the voltage predefinition during the search. It is calculated anew in each step.

The specified equation for the voltage predefinition can also be used as a termination condition or limitation of the search area in the case of current predefinition.

Current predefinition (only in conjunction with termination criterion for left-hand search):

It is generally intended always to be ensured that the present power is greater than the minimum power:

$$Upv*Ipv >= Pmin$$

Upv:=present PV voltage
Ipv:=present PV current
Pmin:=minimum allowed power during the search During the left-hand search 6, the search is terminated at the latest if:

$$Upv < Pmax/Isearch$$

Upv:=present PV voltage
Pmax:=maximum power found previously
Isearch:=maximum search current (or maximum inverter PV current).

It follows therefrom that the PV voltage is greater than or equal to the previously found power divided by the maximum search current:

$$Upv >= Pmax/Isearch$$

Upv:=present PV voltage
Pmax:=maximum power found previously
Isearch:=maximum search current (or maximum inverter PV current).

The PV voltage is therefore equal to the previously found power divided by the maximum PV search current. If it is inserted into the first-mentioned equation, it follows that:

$$Pmax/Isearch*Ipv >= Pmin$$

Ipv:=present PV current
Pmax:=maximum power found previously
Isearch:=maximum search current (or maximum inverter PV current), and
Pmin:=minimum allowed power during the search.

If the intention now is to calculate the maximum allowed search current depending on the present current, the minimum allowed power and the maximum power found previously, then it follows that:

$$I''search = Ipv*Pmax/Pmin \quad (G21)$$

Where:
Ipv:=present PV current,
Pmax:=maximum power found previously,
I''search:=maximum search current taking account of a defined minimum power, and
Pmin:=minimum allowed power during the search.

Taking account of the maximum search current Isearch, the maximum search current results as:

$$\text{maximum search current} = \min(I''search, Isearch) \quad (G22)$$

$$\text{maximum search current} = \min(Ipv*Pmax/Pmin, Isearch) \quad (G23)$$

Where:
I''search:=maximum search current taking account of a defined minimum power,
Isearch:=maximum search current (or maximum inverter PV current),
Ipv:=present PV current,
Pmax:=maximum power found previously, and
Pmin:=minimum allowed power during the search.

The abovementioned maximum search current should ideally be used as a limit value for the current predefinition (limit search current 36) during the search. However, it can also be inserted into the previously mentioned termination conditions for limiting the search area. The abovementioned maximum search current is calculated anew in each step.

The specified equation for the current predefinition can also be used as a termination condition or limitation of the search area in the case of voltage predefinition.

A description for the obviation of the search in the opposite direction will now follow.

If a higher power point is found during the search, then the search in the opposite direction can be obviated, if appropriate.

The decision as to whether, in the case of a right-hand search, the search in the opposite direction can be obviated is derived with reference to FIG. 17. Proceeding from the maximum gradient in an IU characteristic curve (actual characteristic curve 11) of a PV module or of a PV generator, the PV voltage Upv can maximally remain constant when the PV current Ipv is raised. In conjunction with the maximum search current 30, therefore, the maximum possible power during the left-hand search can be calculated as follows:

$$\text{Maximum possible power during left-hand search} = Ustart*Isearch$$

Where:
Ustart:=PV voltage (start voltage 22) before the search, and
Isearch:=maximum search current 30.

If the power found during the right-hand search 5 (right-hand maximum power 15 at a found global maximum power point MPP 2) exceeds the possible left-hand maximum power 18 during a left-hand search, then the left-hand search can be obviated. In this case, the start point 4 before the search can be a global or local maximum power point MPP, and also any point on the IU characteristic curve or actual characteristic curve 11.

The corresponding condition for the fact that the left-hand search 6 can be obviated reads as follows:

$$Ustart*Isearch <= Pmax \quad (G24)$$

Where:
Ustart:=PV voltage before the search,
Isearch:=maximum search current (or maximum inverter PV current), and
Pmax:=maximum power found during the search.

The maximum search current 30 used here can likewise be correspondingly reduced to the rated search current 35 by means of the rated power of the connected photovoltaic generator.

Figure 18:
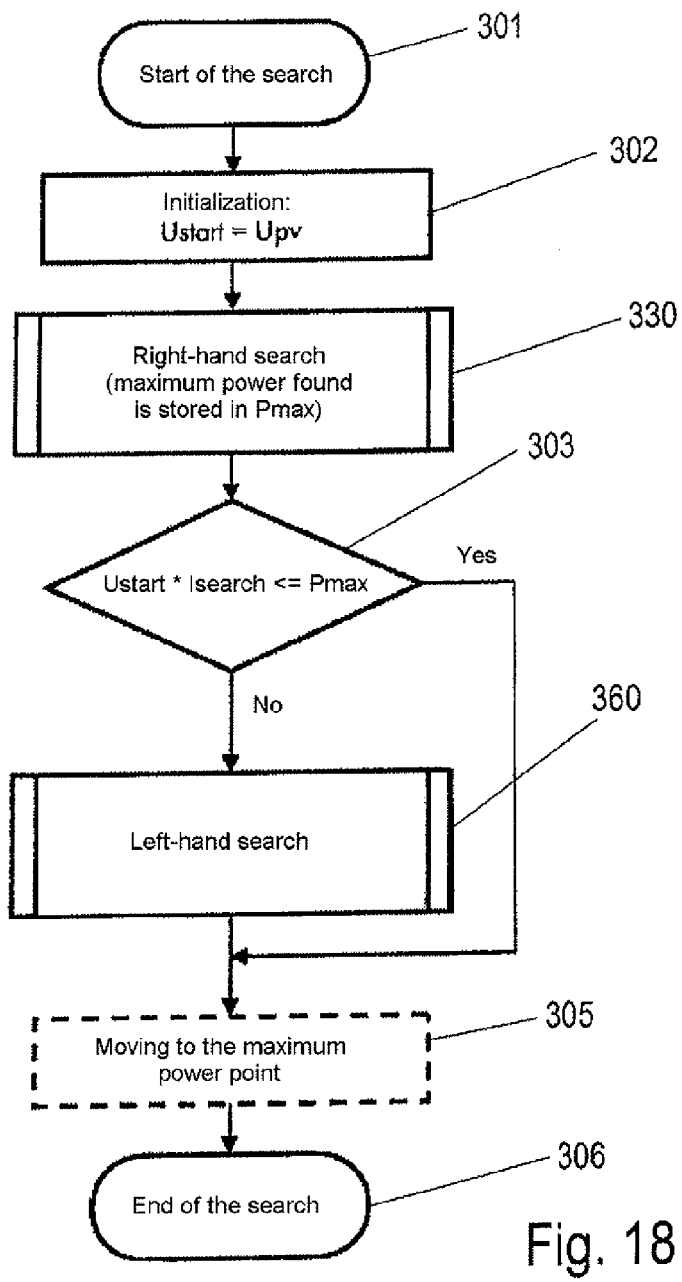
FIG. 18 shows an example flowchart for a right-hand search according to FIG. 17.

The corresponding flowchart is illustrated in the case of voltage or current predefinition in FIG. 18.

In this case the following hold true:
Ustart:=PV voltage before the search,
Isearch:=maximum search current (or maximum inverter PV current), and
Pmax:=maximum power found during the search.

At step 301, the search begins. At step 302, an initialization Ustart=Upv is effected. This is followed by a right-hand search at step 330, wherein a maximum power found is stored as Pmax.

At a comparison step 303, the condition $$Ustart*Isearch <= Pmax$$

is checked as to whether a further left-hand search can be obviated. If this is not the case, then a left-hand search is carried out at step 360.

If the left-hand search can be obviated on account of the comparison at step 303, then step 360 is skipped.

At step 305, the maximum power point found is moved to. The search is ended at step 306.

Figure 19:
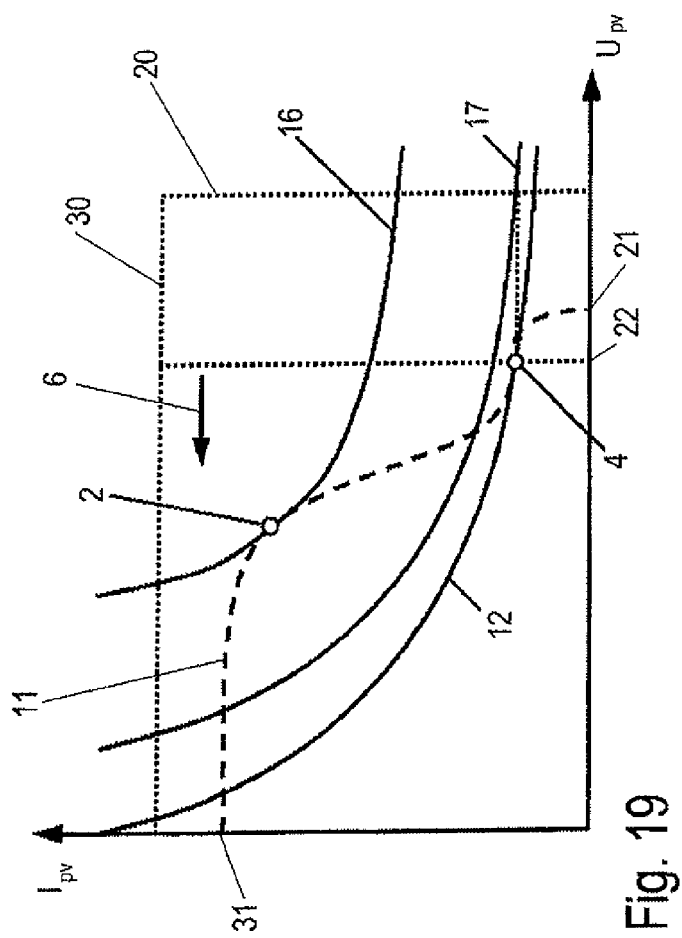
FIG. 19 shows an example graphical illustration for elucidating obviation of the search in the opposite direction in the case of a left-hand search.

The decision as to whether, in the case of a left-hand search, the search in the opposite direction can be obviated is derived with reference to FIG. 19. On account of the characteristic of an IU characteristic curve, the current Ipv can maximally remain constant during the right-hand search. In conjunction with the maximum search voltage 20, therefore, the possible maximum power 17 during the right-hand search can be calculated:

Maximum possible power during right-hand
search=$I$start*$U$search

Where Istart:=PV current before the search and Usearch:=maximum search voltage.

If, during the left-hand search 6 proceeding from a start point 4 of a maximum power 12 with a start voltage 22, a found left-hand maximum power 16 with a global maximum power point MPP 2 exceeds the possible right-hand maximum power 17 during a right-hand search, then the right-hand search can be obviated. In this case, the start point 4 before the search can be a global or local maximum power point MPP and also any point on the IU characteristic curve or actual characteristic curve 11.

The corresponding condition for the fact that the right-hand search can be obviated reads:

$$I\text{start}*U\text{search}<=P\text{max} \quad (G25)$$

Where:
Istart:=PV current before the search,
Usearch:=maximum search voltage (or maximum tracking voltage or maximum inverter PV voltage), and
Pmax:=maximum power found during the search.

The maximum search voltage 20 used here can likewise be correspondingly reduced to a rated search voltage 25 by means of the rated power of the connected photovoltaic generator and/or by means of the search area limitation for ensuring a defined minimum power 14.

Figure 20:
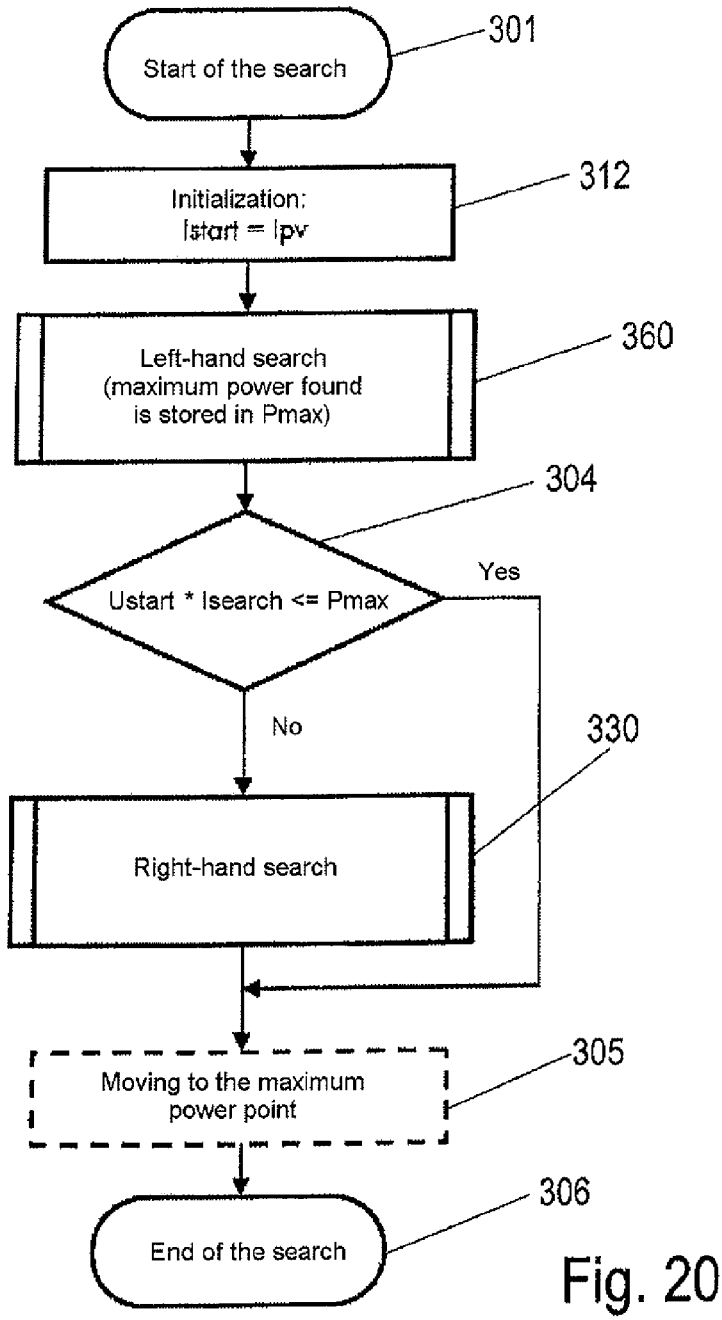
FIG. 20 shows an example flowchart for a right-hand search according to FIG. 19.

The corresponding flowchart arises in the case of voltage or current predefinition as illustrated in FIG. 20.

In this case, the following hold true:
Istart=PV current before the search,
Usearch=maximum search voltage (or maximum tracking voltage or maximum inverter PV voltage), and
Pmax=maximum power found during the search.

The search is started at step 301. At step 312, an initialization Istart=Ipv is effected. This is followed by a left-hand search at step 360, wherein a maximum power found is stored as Pmax.

At a comparison step 304, the condition $$I\text{start}*U\text{search}<=P\text{max}$$

is checked as to whether a further right-hand search can be obviated. If this is not the case, then a left-hand search is carried out at step 330.

If the right-hand search can be obviated on the basis of the comparison at step 304, then step 330 is skipped.

At step 305, the maximum power point found is moved to. The search is ended at step 306.

Figure 21:
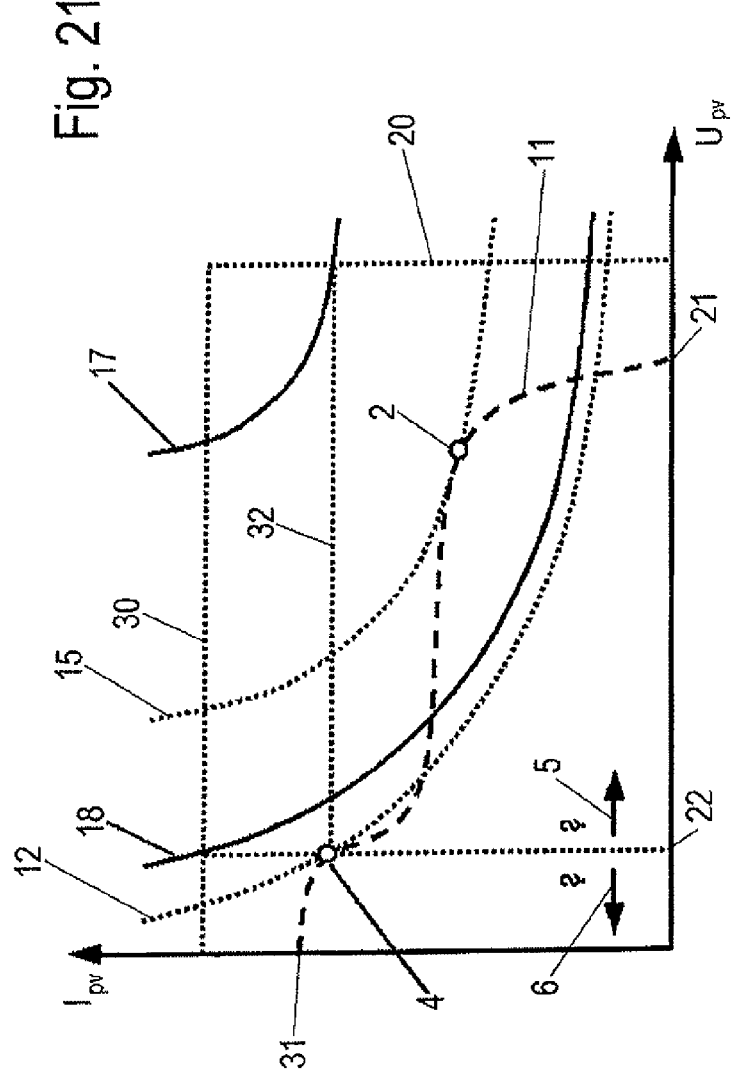
FIG. 21 shows an example graphical illustration for elucidating a choice of the search direction with an initial right-hand search.
Figure 23:
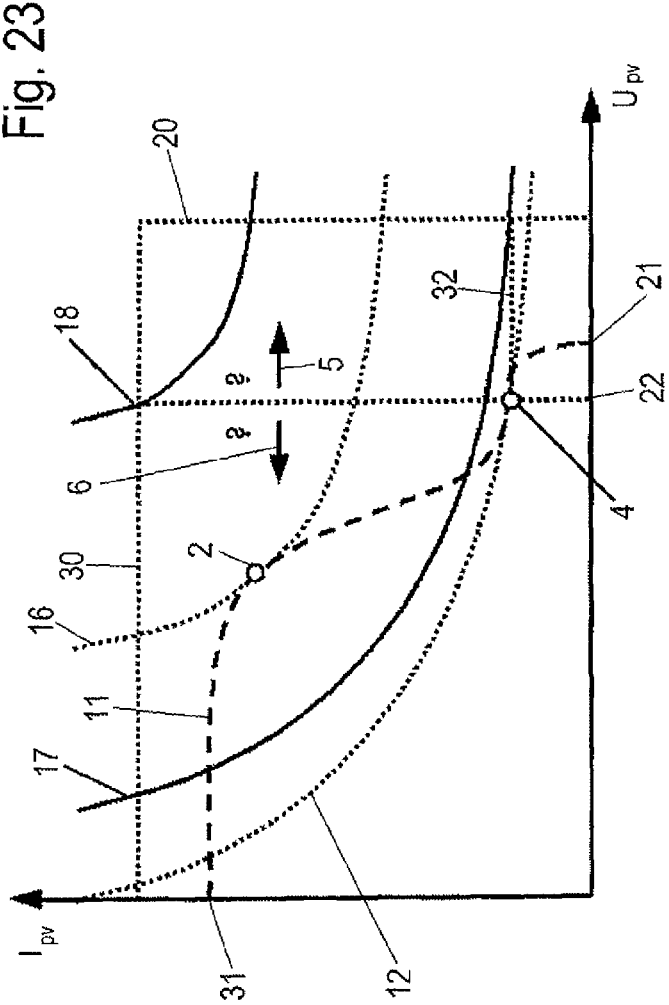
FIG. 23 shows an example graphical illustration for elucidating a choice of the search direction with an initial left-hand search.

In order that the conditions for the obviation of the search in the opposite direction in the event of a higher power being found can take effect, it is necessary to begin with the correct search direction. It is therefore expedient to decide on the correct search direction before the beginning of the search. This can be done with the aid of the maximum possible power 18 during a left-hand search and the maximum possible power 17 during a right-hand search. If the maximum possible power 17 during a right-hand search is greater than the maximum possible power 18 during a left-hand search, then it is expedient to begin with the right-hand search. If a higher power point is found in this case, then for the obviation of the search in the opposite direction it is only necessary for the smaller of the two powers to be exceeded, as shown in FIGS. 21 and 23. In this case, the start point 4 before the search and upon the selection of the search direction can be a global or local maximum power point MPP and also any point on the IU characteristic curve or actual characteristic curve 11.

FIG. 21 shows an example graphical illustration for elucidating a selection of the search direction with an initial right-hand search.

The search area is delimited by a possible right-hand maximum power 17. The actual characteristic curve 11 has a global maximum power point MPP 2 lying on the curve of a right-hand maximum power 15. The curve having the reference symbol 18 indicates a possible left-hand maximum power. The start voltage 22 and the start current 32 result on the basis of the start point 4 of the previous maximum power 12; search voltage 20 and search current 30 are specified as maximum values.

The condition for the fact that the intention is to begin with the right-hand search 5 reads (see FIG. 21):

$$I\text{start}*U\text{search}>U\text{start}*I\text{search} \rightarrow \text{right-hand search first} \quad (G26)$$

Where:
Istart=PV current before the search,
Usearch:=maximum search voltage (or maximum tracking voltage or maximum inverter PV voltage),
Ustart:=PV voltage before the search, and
Isearch:=maximum search current (or maximum inverter PV current).

The maximum search current 30 used here can likewise be correspondingly reduced by means of the rated power of the connected photovoltaic generator. The maximum search voltage 20 used can be correspondingly reduced by means of the rated power of the connected photovoltaic generator and/or by means of the search area limitation for ensuring a defined minimum power 14.

Figure 22:
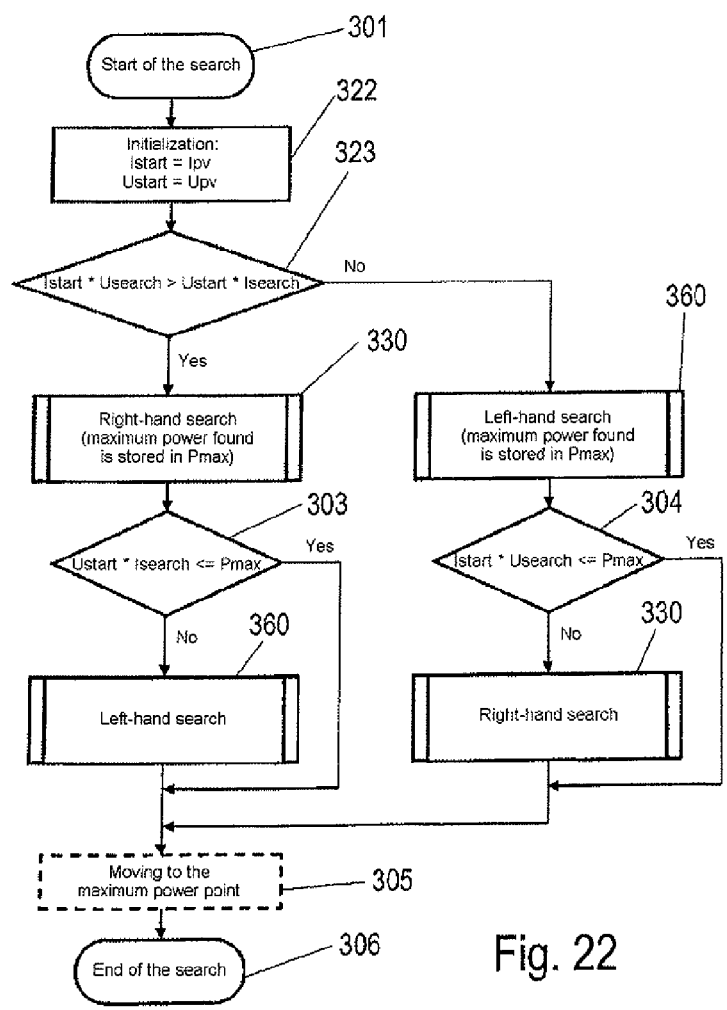
FIG. 22 shows an example flowchart in the case of a choice of the search direction according to FIG. 21.

The corresponding flowchart in the case of voltage or current predefinition is shown in FIG. 22.

In this case, the following hold true:
Istart:=PV current before the search,
Usearch:=maximum search voltage (or maximum tracking voltage or maximum inverter PV voltage),
Ustart:=PV voltage before the search, and
Isearch:=maximum search current (or maximum inverter PV current).

The search is started at step 301, and an initialization for Istart=Ipv and Ustart=Upv follows at step 322. At step 323 a comparison step follows in which a decision is made as to which search direction is taken first. The comparison condition reads:

$$I\text{start}*U\text{search}>U\text{start}*I\text{search}$$

If this condition is met, then the search begins with the right-hand search at step 330, followed by a comparison step 303, in which with the condition $$U\text{start}*I\text{search}<=P\text{max}$$

a check is made as to whether the search is continued on the left-hand side with step 360 or that is skipped. At step 305, the maximum power point is moved to and, at step 306, the search is ended.

If the condition $$I_{start} * U_{search} > U_{start} * I_{search}$$

at step 323 is not met, then at step 360 the method begins with the left-hand search first. At the comparison step 304, with the condition $$I_{start} * U_{search} <= P_{max}$$

a check is made as to whether the search is continued on the right-hand side with step 330 or that is skipped. At step 305, the maximum power point is moved to and, at step 306, the search is ended.

If both powers in the condition (G26) are equal in magnitude, then the first search direction is unimportant.

The condition (G26) can likewise be reformulated to a condition for beginning with the left-hand search:

$$I_{start} * U_{search} < U_{start} * I_{search} \rightarrow \text{left-hand search first} \quad (G27)$$

Where:
Istart:=PV current before the search,
Usearch:=maximum search voltage (or maximum tracking voltage or maximum inverter PV voltage),
Ustart:=PV voltage before the search, and
Isearch:=maximum search current (or maximum inverter PV current).

The difference with respect to the condition (G26) consists in the inversion of the inequality sign.

FIG. 23 illustrates an example graphical illustration for elucidating a selection of the search direction with an initial left-hand search.

The search area is delimited by a possible left-hand maximum power 18. The actual characteristic curve 11 has a global maximum power point MPP 2 lying on the curve of a left-hand maximum power 16. The curve having the reference symbol 17 indicates a possible right-hand maximum power. The start voltage 22 and the start current 32 result on the basis of the start point 4 of the previous maximum power 12; search voltage 20 and search current 30 are specified as maximum values.

The maximum search current 30 used here can likewise be correspondingly reduced by means of the rated power of the connected photovoltaic generator. The maximum search voltage 20 used can be correspondingly reduced by means of the rated power of the connected photovoltaic generator and/or by means of the search area limitation for ensuring a defined minimum power.

The corresponding flowchart in the case of voltage or current predefinition is contained in FIG. 22 by virtue of the condition (G26) not being met in the comparison step 323 (inversion of the inequality sign). The explanations have already been indicated above in this respect.

The invention is not restricted to the example embodiment explained above. It can, of course, be modified within the scope of the appended claims.

Thus, by way of example the method according to the invention can be used for searching for a higher or maximum power point in order to transfer an existing tracking method to the global maximum power point MPP or in order to find a start point for a tracking method, but it can also itself be used as a tracking method. The invention is not restricted to one or more of the exemplary embodiments described above. Rather, there is no restriction to the pure wording of the claims, rather equivalents with which the aim is achieved using other means in another way also come under the wording of the claims.

In particular, the various termination criteria in the description can be used diversely in combination, supplementarily and in adapted fashion.

The invention claimed is:

1. A method for determining a maximum power point (MPP) of a photovoltaic generator (PV) by variation of at least one parameter of two parameters comprising a search voltage and a search current by means of a device connected downstream of the photovoltaic generator, within a maximally searchable search area on a power/voltage curve, comprising:
   a) initializing by defining a start point with a start power comprising a start voltage and a start current;
   b) searching for the maximum power point (MPP) in at least one search direction by a repeated variation of the search voltage or the search current in the search area taking account of at least two limiting conditions for limiting the search area, wherein at least one of the limiting conditions for limiting the search area is determined with evaluation of parameters provided in an operating state already attained during the search; and
   c) ending the search if one of the at least two limiting conditions for limiting the search area in step b) is met.

2. A method for determining a maximum power point (MPP) of a photovoltaic generator (PV) by variation of at least one parameter of the two parameters comprising a search voltage and a search current by means of a device connected downstream of the photovoltaic generator, within a maximally searchable search area on a power/voltage curve, comprising:
   a) initializing by defining a start point with a start power comprising a start voltage and a start current,
   b) searching for the maximum power point (MPP) in a first search direction by a repeated variation of the search voltage or the search current in the search area taking account of at least one first limiting condition for limiting the search area, wherein the first limiting condition for limiting the search area is determined with evaluation of parameters provided in an operating state already attained during the search;
   c) ending the search in the first search direction if the first limiting condition for limiting the search area in step (b) is met;
   d) then searching for the maximum power point (MPP) in a second search direction by a repeated variation of the search voltage or the search current in the search area taking account of at least one second limiting condition for limiting the search area, wherein the second limiting condition for limiting the search area are is determined with evaluation of parameters provided in an operating state already attained during the search; and
   e) ending the search in the second search direction if the second limiting condition for limiting the search area in step d) is met.

3. The method according to claim 2, wherein one or more of the at least one first limiting condition and the at least one second limiting condition comprises two or more limiting conditions.

4. The method according to claim 2, wherein the at least one first limiting condition for limiting a search area comprises a determined termination condition that states that the search direction is maintained as long as there is a prospect of a power increase in the remaining search area.

5. The method according to claim 4, wherein the power increase exceeds a predefined minimum value that is different from zero.

6. The method according to claim 2, wherein a maximum search voltage and a maximum search current are taken into account when defining the search area at the start point.

7. The method according to claim 2, wherein the searching in the first search direction comprises a right-hand search.

8. The method according to claim 2, wherein the searching in the second search direction comprises a left-hand search.

9. The method according to claim 2, further comprising continuously checking whether one of the limiting conditions for limiting the search area is met during the progression of the method.

10. The method according to claim 2, wherein the at least one first limiting condition for limiting a search area comprises a logically determined termination condition that states that a minimum power is undershot in the event of a search direction being maintained.

11. The method according to claim 2, wherein the at least one first limiting condition is a termination condition that takes account of one or more of the following parameters individually or in combination:
- Upv:=present photovoltaic generator voltage,
- ipv:=present photovoltaic generator current,
- Ppv:=present photovoltaic generator power,
- Pmin:=a minimum power of the photovoltaic generator that is to be complied with,
- Pmax:=maximum power previously found during a search, and
- Isearch:=maximum search current (or maximum inverter PV current),
- Usearch:=maximum search voltage,
- Prated:=rated power of the photovoltaic generator,
- ki:=factor MPP current/short-circuit current of a corresponding cell type.

12. The method according to claim 2, wherein a maximum possible power in the first search direction is higher than a maximum possible power in the second search direction.

13. The method according to claim 2, wherein the maximum power point respectively determined is stored.

14. The method according to claim 2, wherein the determined maximum power point is set after the search has been ended.

15. The method according to claim 2, wherein the searching in the second search direction is skipped if a limiting condition for limiting the search area in the first search direction is met.

16. The method according to claim 2, wherein the first limiting condition is different from the second limiting condition.

* * * * *